United States Patent
German et al.

(10) Patent No.: US 7,765,148 B2
(45) Date of Patent: Jul. 27, 2010

(54) METHOD AND SYSTEM FOR FACILITATING PAYMENT OF AN ONLINE AUCTION TRANSACTION

(75) Inventors: Dan A. German, Woodinville, WA (US); Dominic J. Morea, Massapequa Park, NY (US); Henry T. Tsuei, Omaha, NE (US); John Duncan, Eatons Neck, NY (US); Matt Golub, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/673,731

(22) Filed: Feb. 12, 2007

(65) Prior Publication Data

US 2007/0136192 A1 Jun. 14, 2007

Related U.S. Application Data

(63) Continuation of application No. 09/476,386, filed on Dec. 30, 1999, now Pat. No. 7,177,836.

(51) Int. Cl.
G06Q 40/00 (2006.01)
(52) U.S. Cl. .......................................... 705/37; 705/30
(58) Field of Classification Search .................... 705/1, 705/10–44; 707/10, 100
See application file for complete search history.

(56) References Cited

U.S. PATENT DOCUMENTS

| | | | |
|---|---|---|---|
| 5,220,501 A | 6/1993 | Lawlor et al. | |
| 5,555,496 A | 9/1996 | Tackbary et al. | |

(Continued)

FOREIGN PATENT DOCUMENTS

EP 0745961 A2 4/1996

(Continued)

OTHER PUBLICATIONS

Godwin, "Travel Weekly" v.44, p. 19(2) dated Dec. 23, 1985.

(Continued)

*Primary Examiner*—Frantzy Poinvil
(74) *Attorney, Agent, or Firm*—Sutherland Asbill & Brennan LLP

(57) ABSTRACT

A method for enabling two individual consumers to complete a transaction that includes payment from one consumer (the payor, or buyer) to another consumer (the payee, or seller). An intermediary typically operates the service over a computer network of nodes, such as the Internet. The buyer has the convenience of paying through a variety of different payment instruments. Likewise, the seller has the convenience of receiving payment through a variety of different disbursement instruments. For a fee, the intermediary collects the payment from the buyer and pays the seller. Although the intermediary may receive payment from the buyer before the intermediary transfers the payment to the seller, the intermediary may choose to pay the seller before receiving payment from the buyer. In this case, the intermediary assumes the risk of nonpayment by the buyer. Alternatively, the intermediary may pay a third party that specializes in processing transactions for the payment instrument chosen by the buyer to assume the risk of nonpayment by the buyer. In this case, the intermediary receives a promise of payment from the third party before the intermediary pays the seller. Such a promise of payment from the third party is referred to as an authorization.

44 Claims, 20 Drawing Sheets

U.S. PATENT DOCUMENTS

| | | | |
|---|---|---|---|
| 5,629,982 A | 5/1997 | Micali | |
| 5,664,110 A | 7/1997 | Green et al. | |
| 5,664,100 A | 9/1997 | Green et al. | |
| 5,699,528 A | 12/1997 | Hogan | |
| 5,732,400 A | 3/1998 | Mandler et al. | |
| 5,745,886 A | 4/1998 | Rosen | |
| 5,757,917 A | 5/1998 | Rose et al. | |
| 5,794,221 A | 8/1998 | Egendorf | |
| 5,825,003 A | 10/1998 | Jennings et al. | |
| 5,826,241 A | 10/1998 | Stein et al. | |
| 5,884,288 A * | 3/1999 | Chang et al. | 705/40 |
| 5,897,622 A | 4/1999 | Blinn et al. | |
| 5,899,980 A | 5/1999 | Wilf et al. | |
| 5,915,023 A | 6/1999 | Bernstein | |
| 5,936,221 A | 8/1999 | Corder et al. | |
| 5,960,412 A | 9/1999 | Tackbary et al. | |
| 5,963,647 A | 10/1999 | Downing et al. | |
| 5,966,698 A | 10/1999 | Pollin | |
| 5,974,146 A | 10/1999 | Randle et al. | |
| 6,029,150 A | 2/2000 | Kravitz | |
| 6,032,133 A | 2/2000 | Hilt et al. | |
| 6,044,362 A | 3/2000 | Neely | |
| 6,061,665 A | 5/2000 | Bahreman | |
| 6,064,990 A | 5/2000 | Goldsmith | |
| 6,070,150 A * | 5/2000 | Remington et al. | 705/34 |
| 6,070,798 A | 6/2000 | Nethery | |
| 6,078,907 A | 6/2000 | Lamm | |
| 6,081,790 A | 6/2000 | Rosen | |
| 6,088,683 A * | 7/2000 | Jalili | 705/26 |
| 6,098,053 A | 8/2000 | Slater | |
| 6,119,106 A | 9/2000 | Mersky et al. | |
| 6,122,625 A | 9/2000 | Rosen | |
| 6,128,603 A | 10/2000 | Dent et al. | |
| 6,141,653 A | 10/2000 | Conklin et al. | |
| 6,167,386 A | 12/2000 | Brown | |
| 6,173,272 B1 | 1/2001 | Thomas et al. | |
| 6,175,823 B1 | 1/2001 | Van Dusen | |
| 6,189,787 B1 | 2/2001 | Dorf | |
| 6,202,054 B1 | 3/2001 | Lawlor et al. | |
| 6,246,996 B1 | 6/2001 | Stein et al. | |
| 6,247,047 B1 | 6/2001 | Wolff | |
| 6,263,446 B1 | 7/2001 | Kausik et al. | |
| 6,269,343 B1 * | 7/2001 | Pallakoff | 705/26 |
| 6,269,369 B1 | 7/2001 | Robertson | |
| 6,289,322 B1 | 9/2001 | Kitchen et al. | |
| 6,292,789 B1 | 9/2001 | Schutzer | |
| 6,317,745 B1 | 11/2001 | Thomas et al. | |
| 6,324,525 B1 | 11/2001 | Kramer et al. | |
| 6,339,766 B1 | 1/2002 | Gephart | |
| 6,356,878 B1 | 3/2002 | Walker et al. | |
| 6,411,942 B1 | 6/2002 | Fujimoto | |
| 6,449,599 B1 | 9/2002 | Payne et al. | |
| 6,484,260 B1 | 11/2002 | Scott et al. | |
| 6,578,014 B1 * | 6/2003 | Murcko, Jr. | 705/26 |
| 6,609,113 B1 | 8/2003 | O'Leary et al. | |
| 6,675,153 B1 * | 1/2004 | Cook et al. | 705/74 |
| 6,938,013 B1 | 8/2005 | Gutierrez-Sheris | |
| 7,082,412 B1 * | 7/2006 | Treider et al. | 705/38 |
| 7,177,836 B1 | 2/2007 | German et al. | |
| 2001/0025271 A1 | 9/2001 | Allen | |
| 2001/0032183 A1 | 10/2001 | Landry | |
| 2002/0007341 A1 | 1/2002 | Lent et al. | |
| 2002/0023055 A1 | 2/2002 | Antoginini et al. | |

FOREIGN PATENT DOCUMENTS

| | | |
|---|---|---|
| EP | 0745961 A3 | 7/1998 |
| EP | 0949596 A2 | 10/1999 |
| EP | 1077436 A2 | 2/2001 |
| WO | 9849644 | 11/1998 |
| WO | 9922291 | 5/1999 |
| WO | 0022559 | 4/2000 |
| WO | 0054122 A2 | 9/2000 |
| WO | 0067177 A2 | 11/2000 |
| WO | 0079452 A2 | 12/2000 |
| WO | 0104816 A1 | 1/2001 |
| WO | 0046725 A1 | 5/2008 |

OTHER PUBLICATIONS

Advisory Action mailed Mar. 20, 2009 for related U.S. Appl. No. 11/673,711 filed Feb. 12, 2007.

Non-Final Office action mailed Mar. 19, 2009 for related U.S. Appl. No. 11/673,702 filed Feb. 12, 2007.

Non-Final Office Action mailed Mar. 16, 2009 for related U.S. Appl. No. 09/604,525 filed Jun. 27, 2000.

Interview Summary mailed Jul. 15, 2009 for related U.S. Appl. No. 09/604,525 filed Jun. 27, 2000.

Final Office Action mailed Oct. 19, 2009 for related U.S. Appl. No. 09/604,525 filed Jun. 27, 2009.

Disclosure Statement Under 37 C.F.R. § for U.S. Appl. No. 11/673,731 filed Nov. 2, 2009.

Disclosure under 37 C.F.R. 1.56 dated Mar. 2, 2009, filed for U.S. Appl. No. 11/673,731.

Author Unknown (indicated as Confinity, Inc.), "PayPal for the Palm," 2 pages, found on www.handheldnews.com Internet Website and printed in Sep. 23, 2003, date of publication unknown.

Author Unknown, "A million credit card transactions in five hours," 2 pages, located on www.hoise.com and printed on Oct. 14, 2003, date of publication unknown.

Author Unknown, "About Western Union," 9 pages, located on www.westernunion.com and printed on Jun. 10, 2003, date of publication unknown.

Author Unknown, "AmeriNet, Inc.-Making electronic debit simple/ The Best idea in Payment Systems since the Credit Card," 6 pages, located on www.debit-it.com and printed Feb. 7, 2000, date of publication unknown.

Author Unknown, "BidPay: Buyer FAQs-Sending Payment and Using the Money Order Service," 7 pages, located on www.bidpay.com and printed on Oct. 14, 2003, date of publication unknown.

Author Unknown, "BidPay: Seller FAQs-Receiving Payments and Using the Money Order Service," 7 pages, located on www.bidpay.com and printed on Oct. 14, 2003, date of publication unknown.

Author Unknown, "dot.Bank-The way to send and receive money on the Internet," 7 pages, located at www.dotbank.com and printed Feb. 7, 2000, date of publication unknown.

Author Unknown, "First Data Acquires PaySys International," 2 pages, located on http://www.paysys.com/news/press2001/paysys043001.pdf and printed Oct. 14, 2003, date of publication unknown.

Author Unknown, "Making Checks Our Responsibility," 8 pages, located on www.telecheck.com and printed Feb. 7, 2000, date of publication unknown.

Author Unknown, "Online Payment Services," compiled Nov. 2002, date of publication believed to be in Nov. 2002 or after, 3 pages, found on www.auctionbytes.com Internet Website and printed on Sep. 30, 2003.

Author Unknown, "Products and Services from PaySys," 2 pages, located on www.paysys.com and printed Oct. 14, 2003, date of publication unknown.

Author Uknown, "PayPal.com Case Study," 7 pages, found on fox.rollins.edu Internet Website and printed on Sep. 23, 2003, date of publication unknown.

Author Unknown, "PayPal-News," 3 pages, found on www.andrys.com Internet Website and printed on Sep. 23, 2003, date of publication unknown.

Author Unknown, "Paysys sign up four Asian distributors," 3 pages, located on www.bizjournals.com and printed Oct. 14, 2003, date of publication unknown.

Author Unknown, "PaySys—company overview," 2 pages, located on www.paysys.com and printed Oct. 14, 2003, date of publication unknown.

Author Unknown, "The Way to get Paid," 7 pages, located on www.icheck.com and printed Feb. 7, 2000, date of publication unknown.

Author Unknown, "Transpoint-The Way to Pay Online," 12 pages, located on www.transpoint.com and printed Feb. 10, 2000, date of publication unknown.

Author Unknown, "VisionPLUS Consumer Payment Solution Overview," 2 pages, located on www.paysys.com and printed Oct. 14, 2003, date of publication unknown.

Author Unknown, "WHOIS Search Results-WHOIS Record for bidpay.com," 2 pages, located on www.networksolutions.com and printed Oct. 14, 2003, date of publication unknown.

Baras, Steven, Staff Letters and Memoranda, State of New York Banking Department, Jul. 18, 2000, 2 pages, found on www.banking.state.ny.us Internet Website and printed on Sep. 23, 2003.

Hoffman, Karen Epper, "PayPal Still Running Free but the e-payments company's carefree days may be numbered if regulators decide it's essentially a bank," Bank Technology News, found on www.banktechnews.com Internet Website and printed on Sep. 23, 2003, date of publication unknown.

Latour, Almar, "PayPal Electronic Plan May Be On the Money in Years to Come," The Wall Street Journal Interactive Edition, Nov. 15, 1999, 2 pages, found on www.paypal.com Internet Website and printed on Sep. 23, 2003.

Plotkin, Hal, "Beam Me Up Some Cash," Silicon Valley Insider, Sep. 8, 1999, 3 pages, found on www.halplotkin.com Internet Website and printed on Sep. 23, 2003.

Steiner, Ina, "Accepting Credit Cards When You Sell Items: ProPay and Billpoint Payment Services," Jun. 18, 2004, 4 pages, Auctionbyes-Update No. 16, ISSN-1528-6703, found on www.auctinobyes.com Internet Website and printed on Sep. 30, 2003.

Steiner, Ina, "BidPay.com Offers Click and Pay Services for Buyers," Jan. 23, 2000, 4 pages, No. 6, ISSN-1528-6703, found on www.auctionbytes.com Internet Website and printed on Sep. 23, 2003.

Steiner, Ina, "Follow-up to BidPay Article," Feb. 7, 2000, 4 pages, No. 7, ISSN-1528-6703, found on www.auctionbytes.com Internet Website and printed on Sep. 23, 2003.

Steiner, Ina, "Paypal Online Payment Service—Another Way to Pay for Auction Items," AuctionBytes.com, Feb. 20, 2000, 4 pages, No. 8, ISSN-1528-6703, found on ww.auctionbytes.com Internet Website and printed on Sep. 23, 2003.

Final Office Action mailed Feb. 3, 2009 for U.S. Appl. No. 11/673,711.

* cited by examiner

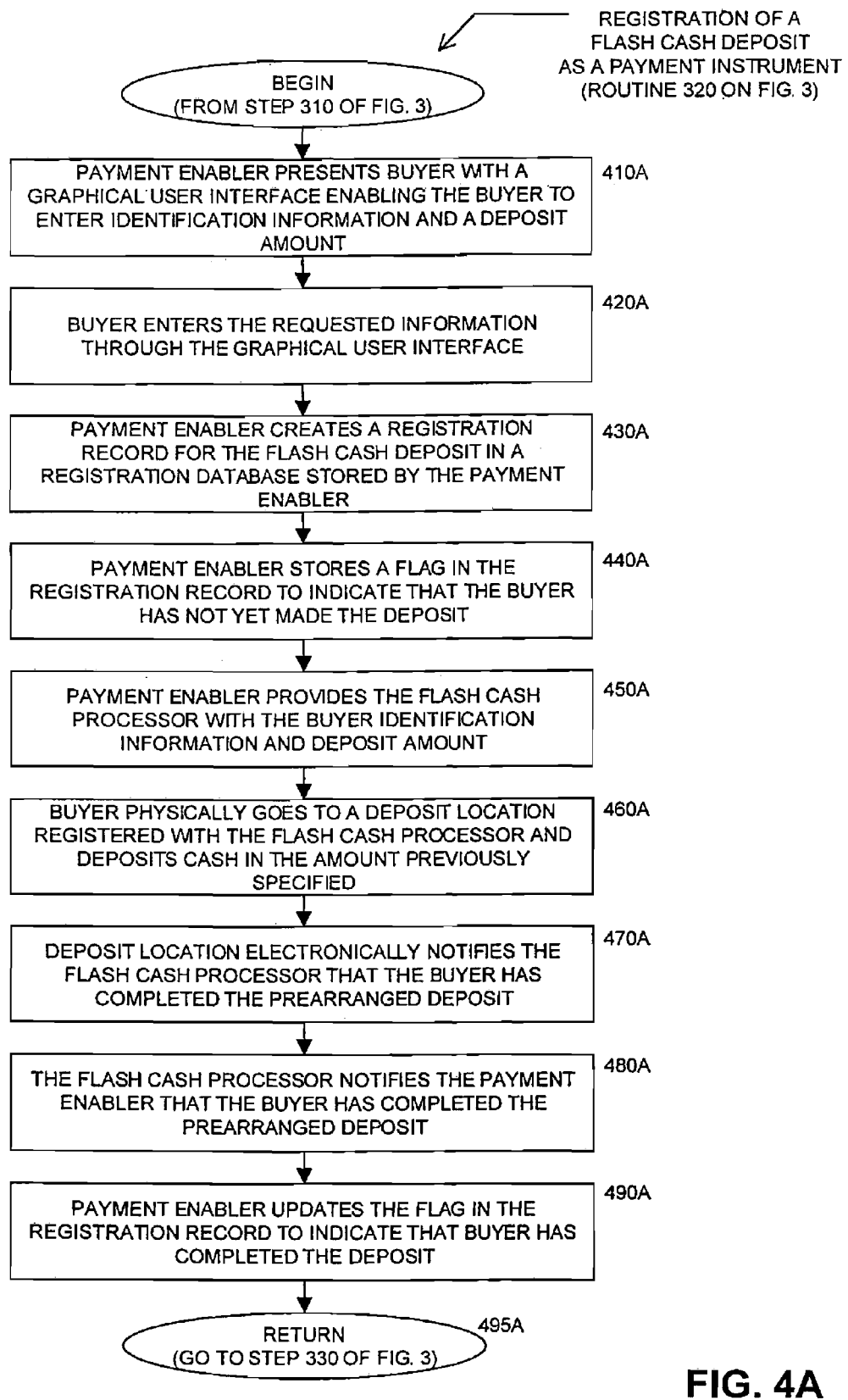

METHOD AND SYSTEM FOR FACILITATING PAYMENT OF AN ONLINE AUCTION TRANSACTION

CROSS REFERENCE TO RELATED APPLICATIONS

This application is a continuation of, and claims the benefit of and priority to, under 35 U.S.C. §120, U.S. patent application Ser. No. 09/476,386, filed Dec. 30, 1999, now U.S. Pat. No. 7,177,836, and This application also discloses similar subject matter as disclosed in U.S. patent application Ser. No. 09/476,384 entitled "A Computer-Implementable Method for Using an On-Line Cash Register" filed on Dec. 30, 1999 (abandoned); U.S. patent application Ser. No. 09/476,385 entitled "Method and System for Payment Transactions and Shipment Tracking Over the Internet" filed on Dec. 30, 1999 (pending); and U.S. patent application Ser. No. 09/604,525 entitled "Method for Facilitating Payment of a Computerized Transaction" filed on Jun. 27, 2000 (pending), the disclosures of which are incorporated herein by reference and made a part hereof.

FIELD OF THE INVENTION

The invention relates generally to computer-implemented financial transactions, and more particularly, relates to completing a transaction between two individual consumers by transferring money from one consumer to the other according to transaction instructions received online from the consumers.

BACKGROUND OF THE INVENTION

The Internet has become a popular place to conduct business. Through Web auction sites, Web sites for displaying classified ads, Web shopping malls, online chat rooms, and other online transaction facilitation sites, two consumers may agree to a transaction. Frequently, such transactions involve the exchange of goods or services for money. While consumers frequently find that agreeing to transactions on the Internet is easy, completing a payment to consummate the transaction is more difficult.

Typically, two consumers who have agreed through the Internet to exchange goods for money resort to offline methods to perform the exchange. For example, the seller may ship the goods to the buyer through a shipping service, and the buyer may send a paper check to the seller.

Such offline methods of exchange are problematic. Because the buyer and the seller are usually strangers, they may not trust each other to perform their mutual obligations under the agreement. Accordingly, they may be unable to agree whether the buyer will send the check first or the seller will send the goods first. Even if the buyer and the seller agree that the seller will ship the goods at the same time as the buyer sends the check, the seller has no guarantee that the check will not bounce. Likewise, the buyer has no guarantee that the goods will arrive in satisfactory condition. Accordingly, a significant percentage of transactions to which an individual buyer and seller have agreed upon over the Internet are never consummated.

Another inconvenience of transactions agreed upon by individuals over the Internet is that the buyer is often limited to paying by cash or paper check. More convenient payment instruments exist, such as credit cards and bank account debits through electronic fund transactions. However, the buyer typically does not have the option to use these other payment instruments when the seller is an individual as opposed to a retail business that has been pre-established as an online merchant.

The term "merchant" is used herein to refer to a seller of goods or services who is authorized by a credit card association (such as DISCOVER, VISA, or MASTERCARD) to submit to the credit card association charges on credit cards belonging to members of the credit card association. After receiving an authorization for the charge, the merchant then receives from the credit card association a direct deposit into the merchant's bank account of the amount of the charge. As known to those skilled in the art, a business must undergo an approval process in order to become a merchant, and upon approval, the merchant is assigned a merchant number.

Although retail businesses are routinely set up as merchants in order to accept payments through credit cards or electronic fund transactions, this is not an adequate solution to facilitating payments between individuals over the Internet. For example, merchants, after undergoing an extensive underwriting effort, are typically given special privileges, such as a general authorization to charge credit cards. This general authorization provides the merchant with the ability to commit fraud. Specifically, the merchant is capable of charging a customer's credit card more than he should. Also, the merchant may submit charges on a credit card belonging to a credit card association member with which the merchant has never had any contact. For these reasons, the idea of allowing individual sellers to become merchants has heretofore been rejected.

Another problem with an individual seller becoming a merchant is that the approval process for becoming a merchant is frequently more of a hassle than an occasional seller is willing to undergo. The purpose of the approval process is to reduce the risk of fraud by the merchant. Accordingly, the seller usually must submit extensive background information for consideration in the approval process. This may be inconvenient and time consuming for the seller.

Therefore, there is a need in the art for a safe and convenient method by which one consumer can pay a second consumer over the Internet.

SUMMARY OF THE INVENTION

The present invention meets the needs described above in a computer-implemented service that enables two individual consumers to complete a transaction that includes payment from one consumer (the payor, or buyer) to another consumer (the payee, or seller). An intermediary typically operates the service over a computer network of nodes, such as the Internet. The buyer has the convenience of paying through a variety of different payment instruments. Likewise, the seller has the convenience of receiving payment through a variety of different disbursement instruments.

For a fee, the intermediary collects the payment from the buyer and pays the seller. One advantage of a consumer-to-consumer payment process operated by an intermediary is that the risk of fraud by the seller is reduced because the buyer need not provide information about his payment instrument to the seller. Rather, the intermediary maintains information about the buyer's payment instrument in secret. Similarly, the intermediary need not provide the seller with a general authorization to charge a payment instrument, such as a credit card.

Because the intermediary collects payment from the buyer, the consumer-to-consumer payment process of the present invention also provides the advantage of not requiring the seller to register as a merchant. Rather, the seller simply registers a disbursement instrument for receiving payment from the intermediary. This disbursement instrument registration process may be simpler and more convenient than the process a retail business typically undergoes to register as a merchant.

Although the intermediary may receive payment from the buyer before the intermediary transfers the payment to the seller, the intermediary may choose to pay the seller before receiving payment from the buyer. In this case, the intermediary assumes the risk of nonpayment by the buyer.

Alternatively, the intermediary may pay a third party that specializes in processing transactions for the payment instrument chosen by the buyer to assume the risk of nonpayment by the buyer. In this case, the intermediary receives a promise of payment from the third party before the intermediary pays the seller. Such a promise of payment from the third party is referred to as an authorization.

Generally described, the present invention comprises a method for providing a consumer-to-consumer payment service. A payment enabler, which can be a node of a computer network, receives registration of a payment instrument from a payor located at a first remote computer. The payment enabler also receives registration of a disbursement instrument from a payee located at a second remote computer.

Then, the payment enabler receives a command from the payor to pay the payee an amount of money that the payor owes the payee. The command may be the submission of the payor's registration for the payment instrument.

In response to the command to pay the payee, the payment enabler obtains an authorization for a transfer of the amount of money from the payor through the payment instrument to a first intermediary bank account. The amount of money may actually be deposited in the first intermediary bank account at a later time. After obtaining the authorization, the payment enabler may order the transfer of the amount of money from a second intermediary bank, which may be the same account as the first intermediary bank account, through the disbursement instrument to the payee. This payment to the payee may occur after authorization, but before the payment from the payor has been deposited in the first intermediary bank account. Alternatively, the payment to the payee may occur after the payment from the payor has been deposited in the first intermediary bank account.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 4A is a flow chart illustrating a procedure for registration of a flash cash deposit as a payment instrument in accordance with an exemplary embodiment of the present invention.

DETAILED DESCRIPTION OF EXEMPLARY EMBODIMENTS

The present invention is typically embodied in a computer-implemented service that enables two individual consumers to complete a transaction that includes payment from one consumer (the payor, or buyer) to another consumer (the payee, or seller). An intermediary typically operates the service over a computer network of nodes, such as the Internet. The payor has the convenience of paying through a variety of different payment instruments. Likewise, the payee has the convenience of receiving payment through a variety of different disbursement instruments.

Optionally, the intermediary may hold the payment from the payor in escrow until some predetermined condition is fulfilled. Once that predetermined condition is fulfilled, the intermediary pays the payee. If, for example, the transaction between the buyer and seller is for the sale of goods, the intermediary may hold the payment in escrow until the seller has delivered acceptable goods to the buyer. While holding the money in trust during the escrow process, the intermediary may store the money in a bank account.

To fully appreciate the present invention, one must understand the difference between a merchant and a consumer. The term "merchant" is used herein to refer to a seller of goods or services who is authorized by a credit card association (such as DISCOVER, VISA, or MASTERCARD) to submit to the credit card association charges on credit cards belonging to members of the credit card association. After receiving an authorization for the charge, the merchant then receives from the credit card association a direct deposit into the merchant's bank account of the amount of the charge. As known to those skilled in the art, the merchant's bank account must be pre-approved, and upon approval, the merchant is assigned a merchant number.

A consumer, on the other hand, is defined as an individual who has not been registered as a merchant. The computer network of the present invention facilitates payments from a payor to a payee without requiring either consumer to be registered as a merchant. With the help of the figures, in which like numerals refer to like elements throughout the several figures, the detailed description now explains how the computer network accomplishes this.

Overview of the Consumer-to-Consumer Payment Process

Figure 1A:
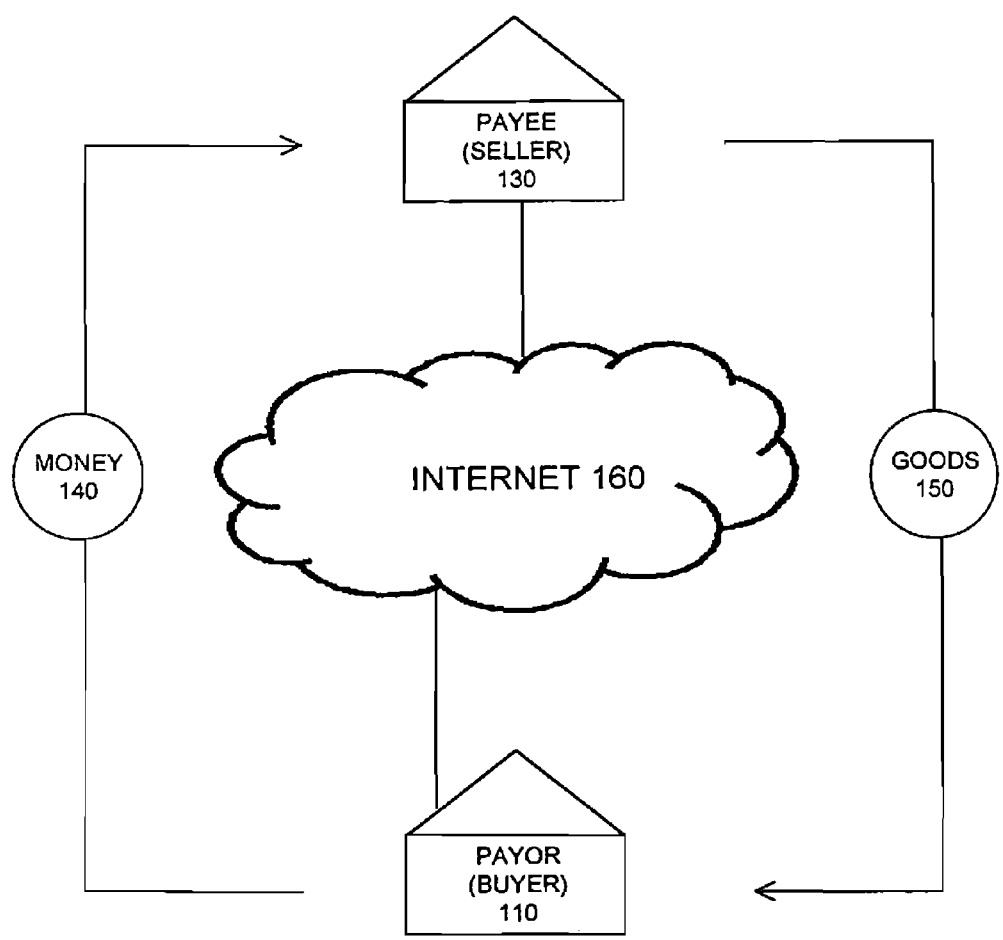
FIG. 1A is a block diagram illustrating a typical scenario in which a consumer-to-consumer payment process would be beneficial.

FIG. 1A illustrates a typical scenario 100A in which a consumer-to-consumer payment process would be beneficial. The scenario 100A depicts a payee (or seller) 130 and a payor (or buyer) 110. The seller 130 and the buyer 110 have concluded an agreement over the Internet 160. Per this agreement, the seller 130 has promised to ship goods 150 to the buyer 110. In return, the buyer 110 has promised to pay the seller 130 an amount of money (also called a payment) 140. The consumer-to-consumer payment process of the present invention provides a convenient solution for enabling the buyer 110 and the seller 130 to consummate the transaction to which they have agreed.

Figure 1B:
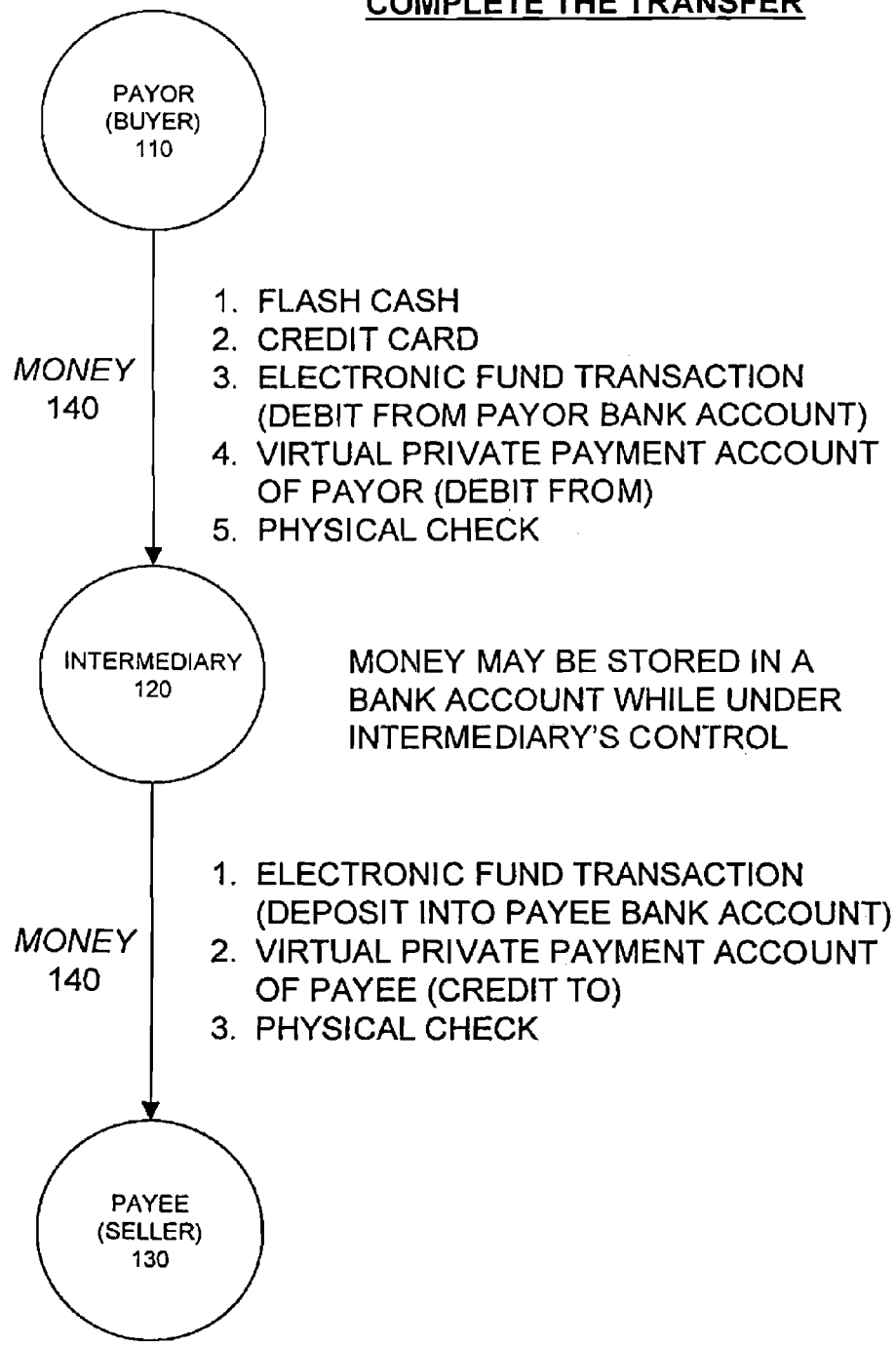
FIG. 1B is a block diagram illustrating the transfer of money in a consumer-to-consumer payment process in accordance with an exemplary embodiment of the present invention.

FIG. 1B provides an illustration 100B of the transfer of money in the consumer-to-consumer payment process. FIG. 1B shows the payor (or buyer) 110 and the payee (or seller) 130. An intermediary 120 facilitates the transfer of money 140 from the buyer 110 to the seller 130. The intermediary 120 is typically a business that operates the consumer-to-consumer payment service.

Generally, the responsibilities of the intermediary 120 include collecting the payment 140 from the buyer 110 and paying the seller 130. For performing this service, the intermediary 120 typically charges a fee. The intermediary may collect this fee by paying the seller an amount equal to the buyer's payment to the intermediary minus the fee.

Although the intermediary 120 may receive payment 140 from the buyer 110 before the intermediary transfers the payment 140 to the seller 130, the intermediary may choose to pay the seller before receiving payment from the buyer. In this case, the intermediary 120 assumes the risk of nonpayment by the buyer 110. If the intermediary 120 has assumed the risk of nonpayment by the buyer 110 and the buyer does not pay in a timely manner, the intermediary may use the fees collected by offering the consumer to consumer payment service to either cover the loss or pursue collection from the buyer.

Instead of assuming the risk of nonpayment in order to pay the seller 130 before receiving payment 140 from the buyer 110, the intermediary 120 may pay a third party (not shown) that specializes in processing transactions for the payment instrument chosen by the buyer 110 to assume the risk of nonpayment by the buyer. In this case, the intermediary 120 chooses the third party processor for the third party's dependability in financial transactions, and the intermediary receives a promise of payment from the third party before the intermediary pays the seller 130. Such a promise of payment from the third party is referred to as an "authorization."

In the consumer to consumer payment process, the intermediary 120 preferably permits the buyer 110 to pay the intermediary through any one of a variety of different financial instruments. As shown in FIG. 1B, these financial instruments, called payment instruments, may include flash cash, a credit card, a bank account (which is debited through an electronic fund transaction), a virtual private payment account (which is debited through an electronic transaction), or a physical check.

Preferably, the intermediary 120 permits the seller 130 to receive payment 140 from the intermediary through any one of a variety of financial instruments. As shown in FIG. 1B, these financial instruments, called disbursement instruments, may include a bank account (which is credited through an electronic fund transaction), a virtual private payment account (which is credited through an electronic transaction), or a physical check. Some financial instruments can be both payment instruments and disbursement instruments.

Credit cards, electronic fund transactions for bank accounts, and the handling of physical checks are well known to those skilled in the art. However, flash cash and virtual payment accounts are not familiar to typical readers. Accordingly, a general description of these two financial instruments is now provided.

Flash cash is a payment instrument that enables a payor to execute payment orders over the Internet based on a prearranged cash deposit. To create the flash cash payment instrument, a payor first communicates over the Internet with a flash cash processor in order to prearrange the cash deposit. The payor then physically visits a location registered with the flash cash processor. At the registered location, the payor deposits cash. At a later time, the payor can instruct the flash cash processor over the Internet to pay the deposited amount (or a lesser amount) to a payee. The payee's bank account is then automatically credited in an electronic fund transaction.

There are many embodiments of a virtual private payment account. Each embodiment differs in the functionality provided by the virtual private payment account. Typically, a virtual private payment account is offered through an online retailer or an Internet service provider (ISP). The owner of the virtual private payment account may buy items, typically through online transactions, and charge them to the virtual private payment account. Because only entities closely associated with the entity offering the virtual private payment account will accept payment from the account, the entity accepting payment from the virtual private payment account is typically not charged a processing fee. In essence, the virtual private payment account is like a private label credit card, but no plastic card is issued to the owner of the account.

When a virtual private payment account owner makes a purchase and charges the purchase to the account, the charge may be covered by a positive balance in the account. The virtual private payment account may also be associated with a line of credit, and purchases charged to the virtual private payment account which result in a negative balance may be billed to the account owner in periodic statements.

Various options for permitting the creation of positive balances in virtual private payment accounts may exist at the discretion of the entity offering the account. For example, the entity offering the virtual private payment account may permit a cash deposit to create a positive virtual private payment account balance. Also, the entity offering the account may permit associated retailers to credit a virtual private payment account, possibly for promotional purposes.

Optionally, the entity offering the virtual private payment account may allow the account owner to receive monetary, disbursements equivalent to the positive account balance. In another embodiment, the entity offering the virtual private payment account may allow the account owner to receive monetary disbursements only for positive account balances created through refunds or cash deposits, but not for positive account balances created by a retailer for promotional purposes.

Computer Network for Enabling Consumer-to-Consumer Payments

Figure 2:
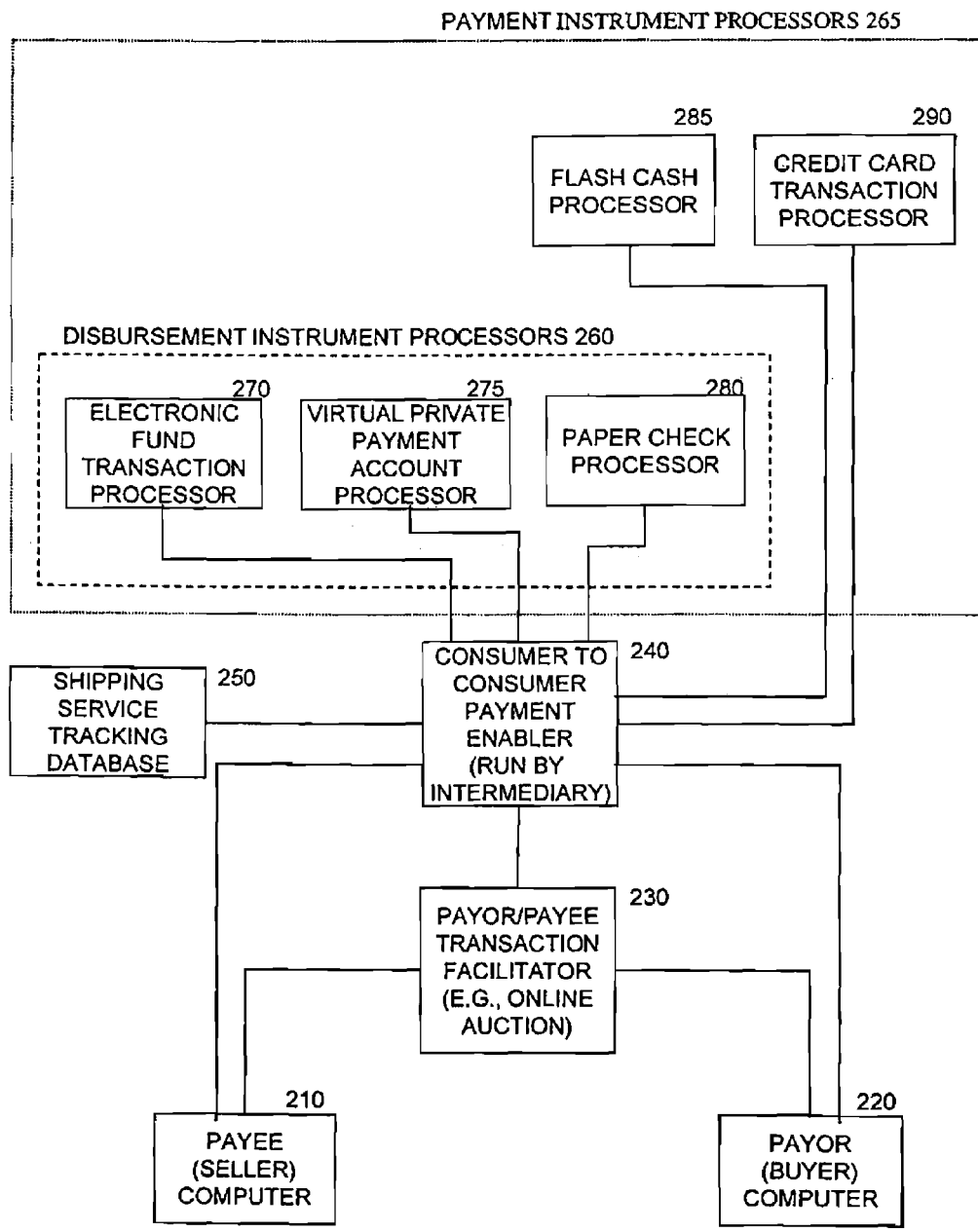
FIG. 2 is a block diagram illustrating a computer network architecture for enabling consumer-to-consumer payments in accordance with an exemplary embodiment of the present invention.

FIG. 2 is a block diagram illustrating an exemplary computer network architecture 200 for providing the consumer to consumer payment service. Each one of the various nodes 210, 220, 230, 240, 250, 270, 275, 280, 285, and 290 performs functions in the consumer to consumer payment process that are different than the functions the other computer nodes perform.

Each node of the network 200 may have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM).

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components. The invention may conveniently be implemented in various program modules that are stored on the computers of the network 200 and implement the methods described in the detailed description.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Likewise, various computer nodes of the network 200 require one or more databases for storing information pertinent to that computer's role in consumer to consumer payment process. In the detailed description, these databases are frequently described with respect to their functionality or the types of information they store. One skilled in the art should recognize that a variety of different databases and a variety of different record structures for storing information in those databases are available for providing the described functionality or storing the described information. Accordingly, details of such database implementations need not be described. Where details of a database implementation are described, the detailed description provides them by way of example, not by way of limitation.

In FIG. 2, the lines connecting the various nodes of the computer network 200 illustrate network communication connections. For example, these connections may be Internet connections. Instead, a given connection between two computers of the network 200 may be a dedicated connection intended to provide a high speed, special purpose communications link between the two computers. When a first computer node is described as remote to a second computer node, the first computer node and the second computer node are linked by a network communication connection.

One skilled in the art will appreciate that the network practicing an embodiment of the present invention may take various forms. Accordingly, one may use other types of networks and combinations of network connections in a given embodiment of the present invention.

Still referring to FIG. 2, the detailed description will describe the functionality of the various computer nodes of the computer network 200. The buyer 110 communicates with the computer network 200 through the buyer computer 220. Likewise, the seller 130 communicates with the computer network 200 through the seller computer 210. Preferably, the buyer computer 220 and the seller computer 210 are connected to the computer network 200 through Internet connections. Using HyperText Transfer Protocol (HTTP), computer nodes 230 and 240 may communicate with the buyer 110 and the seller 130 through Web pages. To use these Web pages, the buyer computer 220 and seller computer 210 typically run an appropriate Web browser.

The described Web pages provide information to the buyer 110 and the seller 130 about the consumer to consumer payment service. Furthermore, these Web pages provide a convenient graphical user interface for receiving information from the buyer 110 and the seller 130. For example, forms, which are well known to those skilled in the art of Web design, provide an easy and efficient mechanism for soliciting and receiving information from the buyer 110 and the seller 130 through Web pages. However, other communication protocols and other graphical user interfaces are known to those skilled in the art, and therefore these communication alternatives may be used for implementing the present invention.

The transaction facilitator 230 may be a Web site that allows two people to define a desired transaction. Usually, the transaction facilitator 230 also serves to introduce the payor 110 and the payee 130. When the transaction is for the sale of goods, the payor 110 is referred to as a buyer, and the payee 130 is referred to as a seller.

A typical transaction facilitator 230 is an Internet auction site, such as EBAY and YAHOO! AUCTION. Generally, such auction sites 230 allow a seller 130 to post an item for sale to potential bidders. Bidders then place bids on the posted items, and the high bidder wins the auction, thereby becoming the buyer 110.

Similarly, the transaction facilitator 230 may be an Internet classifieds site, which allows a seller 130 to post an item for sale at a specified price. The classifieds site 230 then forwards to the seller 130 all offers from potential buyers to buy the item at the specified price. The seller 130 can then accept one of the offers to create a transaction. If implemented by the Internet classifieds site 230, a potential buyer may have the opportunity to negotiate the sale price of the item with the seller 130.

Often, a transaction facilitator 230 requires users of the service offered by the transaction facilitator to register with the transaction facilitator. Typically, a user registers to use the transaction facilitator 230 by providing basic identification information, such as name, e-mail, and password. The transaction facilitator 230 may assign the person a unique user ID for keeping track of information pertaining to the user. The transaction facilitator 230 may use the user ID as a key to a database record storing the information identifying the user and his transactions. To log into the transaction facilitator 230, the user may need to provide the user ID and the appropriate password.

Preferably, the transaction facilitator 230 also has a mechanism for storing information about specific transactions and the buyer 110 and the seller 130 in those transactions. This may be done through a database of transaction records, each identified by a unique transaction ID and having fields for storing the buyer user ID, the seller user ID, the transaction amount, and the item.

After the transaction facilitator 230 determines that the buyer 220 and the seller 210 have agreed upon a transaction, the transaction facilitator refers the transaction to the consumer to consumer payment enabler 240 to administer the consumer to consumer payment service. Typically, the intermediary 120 runs the payment enabler 240. The payment enabler 240 may offer an application programming interface providing transaction facilitators, such as the transaction facilitator 230, with a convenient and standardized means to communicate with the payment enabler.

When referring a transaction to the payment enabler 240, the transaction facilitator 230 may automatically pass information about the buyer 110, the seller 130, and their underlying transaction to the payment enabler. The payment enabler 240 then uses this information to administer the consumer to consumer payment process, thereby facilitating payment from the buyer 110 to the seller 130. By automatically passing transaction information from the transaction facilitator 230 to the payment enabler 240, the consumer to consumer payment service eliminates the need for the buyer 110 and the seller 130 to provide duplicate information to the payment enabler 240 that the buyer and seller already provided to the transaction facilitator when defining their transaction.

Preferably, the transaction facilitator 230 and the payment enabler 240 cooperate to implement the consumer to consumer payment service in a manner that prevents the buyer 110 and the seller 130 from realizing that the transaction facilitation service provided by the transaction facilitator and the consumer to consumer payment service provided by the payment enabler are administered by two different computer nodes, possibly run by two different entities. For example, the transaction facilitator 230 preferably passes the transaction information to the payment enabler 240 without knowledge of the buyer 110 or the seller 130.

When communicating with the buyer 110 and the seller 130 to administer the consumer to consumer payment process, the payment enabler 240 preferably employs Web pages that are branded identically to the Web pages that the transaction facilitator 230 uses when communicating with the buyer and the seller. In other words, all Web pages provided to the buyer 110 and the seller 130 by the transaction facilitator 230 and the payment enabler 240 preferably bear the same trademarks. Alternatively, these Web pages can be co-branded with the trademarks of both the entity running the transaction facilitator 230 and the entity running the payment enabler 240.

Preferably, the payment enabler 240 delegates the responsibility for processing transactions for each type of financial instrument to a different computer node of the network. Specifically, the flash cash processor 285 processes flash cash payments from the buyer 110, the credit card transaction processor 290 processes credit card payments from the buyer 110, the electronic fund transaction processor 270 processes credits to and debits from bank accounts through electronic fund transactions, the virtual private payment account processor 275 processes credits to and debits from virtual private payment accounts, and the check processor 280 processes paper check payments from the buyer 110 and paper check disbursements to the seller 130. Each of the computer nodes 270, 275, 280, 285, and 290, in turn, may interact with other computer nodes (not shown) of the network 200 in order to process a payment from the buyer 110 or a disbursement to the seller 130.

The computer nodes for processing disbursement instruments are called disbursement instrument processors 260. The computer nodes for processing payment instruments are called payment instrument processors 265. All the disbursement instrument processors 260 of the exemplary embodiment of FIG. 2 are also payment instrument processors 265.

Preferably, each of the payment instrument processors 265 are managed by third parties willing to grant authorizations based on transaction requests from the payment enabler 240 for specific dollar amounts. The payment instrument processors 265 may handle authorization requests from the payment enabler 240 in an automated manner. When a payment instrument processor 265 grants an authorization for a specific dollar amount for a specified payment instrument, the managing third party thereby promises payment to the intermediary 120 and assumes the risk of nonpayment by the buyer 110.

To use the consumer to consumer payment process, the payment enabler 240 typically requires the buyer 110 to register a payment instrument and the seller 130 to register a disbursement instrument. At a minimum, registration of a financial instrument involves the payment enabler 240 receiving from the buyer 110 or the seller 130 basic identification information about the financial instrument necessary to make transaction requests for that instrument to the instrument processor 270, 275, 280, 285, or 290. Typically, the payment enabler 240 provides the identification information received from the consumer to the appropriate processor 270, 275, 280, 285, or 290 in order to verify that the financial instrument exists.

If the consumer is attempting to register a payment instrument, the appropriate payment instrument processor 265 may also perform additional background checks on the payment instrument to determine if the payment instrument processor will accept later authorization requests for that payment instrument. Such a background check may, for example, include verifying that the buyer 110 has completed the flash cash deposit, the buyer has completed the check deposit, the buyer has not fraudulently provided the credit card, the buyer does not have a history of overdrawing the bank account provided, or the virtual private payment account processor has a relationship with the entity offering the virtual private payment account. These preliminary background checks are intended to be different than authorization requests, which are later requests from the payment enabler 240 for a transaction on a financial instrument for a specific dollar amount at a specific point in time. The payment instrument processors 265 need not base these preliminary background checks on a consideration of specific amounts. Rather, the payment instrument processors 265 may base these preliminary background checks on whether the payment instrument the buyer 110 is attempting to register is in good standing.

Preferably, the payment enabler 240 permits a given consumer to register both as a buyer 110 and as a seller 130. This allows the consumer to use the consumer to consumer payment service for multiple transactions, in some of which the consumer is a buyer 110 and in some of which the consumer is a seller 130. Furthermore, the payment enabler 240 may permit the consumer to register multiple payment instruments and multiple disbursement instruments. If the payment enabler 240 allows registration of multiple financial instruments, the payment enabler 240 may permit the consumer to identify a preferred payment instrument and a preferred disbursement instrument. Typically, the consumer can change the preferred financial instrument at any time before confirming the consumer's desire to proceed with a given transaction.

After the buyer 110 and the seller 130 have registered a financial instrument, the payment enabler obtains confirmation from both the buyer and the seller that they wish to proceed with the transaction. The payment enabler 240 also requires the buyer 110 to specify the payment instrument and the seller 130 to specify the disbursement instrument to be used. The payment enabler 240 then obtains authorization for payment 140 from the buyer 110 from the appropriate payment instrument processor 265, and the intermediary 120 receives payment from that payment instrument processor in due course.

After receiving authorization for payment 140, the payment enabler 240 notifies the appropriate disbursement instrument processor 260 to pay the seller 130 through the disbursement instrument chosen by the seller. The disbursement instrument processor 260 typically does this by drawing on funds in a bank account of the intermediary 120.

In one embodiment, the payment enabler 240 does not pay the seller 130 until the seller has delivered acceptable goods to the buyer 110 through an authorized shipping service. To monitor the status of a pending shipment, the payment enabler 240 may interface with a shipping service tracking database 250.

The shipping service tracking database 250 is maintained by the shipping service the seller 130 uses to ship the goods. When a parcel is sent through an authorized shipping service, the shipping service assigns the parcel a tracking number. For each parcel sent using the shipping service, the shipping service tracking database 250 stores the corresponding tracking number and delivery status. The shipping service tracking database 250 is functional for receiving a tracking number and replying with the status of the parcel corresponding to that tracking number.

The payment enabler 240 (or the transaction facilitator 230) may also provide a Web page enabling both the buyer 110 and the seller 130 to request the status of the parcel used to ship the goods. Once such a request has been received, the payment enabler 240 uses the tracking number to query the shipping service tracking database 250 for the status of the delivery. The payment enabler 240, in turn, relays the status of the delivery to the buyer 110 or the seller 130 through a Web page.

One procedure for tracking the shipment of goods requires the seller 130 to notify the payment enabler 240 of the tracking number received from the shipping service. After the payment enabler 240 receives authorization for payment 140, the payment enabler notifies the seller 130 to ship the goods to the buyer 110. The seller 130 then ships the goods to the buyer 110 through an authorized shipping service and obtains a tracking number. The payment enabler 240 requires the seller 130 to enter this tracking number into the payment enabler. Using this tracking number, the payment enabler 240 can query the shipping service tracking database 250 to determine the delivery status of the goods.

Alternatively, the payment enabler 240 may automatically provide the seller 130 with a tracking number to be used for shipping the goods. Upon receiving authorization for the payment 140, the payment enabler 240 may query the shipping service tracking database 250 to obtain a valid tracking number. Through a Web page, the payment enabler 240 then notifies the seller 130 to ship the goods to the buyer 110 using the authorized shipping service and this predetermined tracking number. Then, the seller 130 delivers the goods to the shipping service along with the predetermined tracking number provided by the payment enabler 240. The shipping service, in turn, ships the goods using a parcel identified by the predetermined tracking number and appropriately maintains the shipping service tracking database 250. Because the payment enabler 240 provided the tracking number to the seller 130, the payment enabler knows the tracking number and can query the shipping service tracking database 250 for the delivery status of the goods.

Once the payment enabler 240 determines that the goods have been delivered to the buyer 110, the payment enabler may further determine if the goods are acceptable to the buyer 110 before paying the seller 130. The payment enabler 240 may make this determination by providing the buyer 110 a predetermined amount of time, measured from the date of delivery indicated by the shipping service tracking database 250, to notify the payment enabler of rejection of the goods. If the buyer 110 notifies the payment enabler 240 that acceptable goods have been delivered or the buyer does not reject the goods within a predetermined time after the shipping service tracking database 250 indicates that the goods have been delivered, the payment enabler 240 notifies the appropriate disbursement instrument processor 260 to pay the seller 130 through the disbursement instrument chosen by the seller.

One skilled in the art will appreciate that the present invention is not limited to the computer network architecture 200 of FIG. 2. Specifically, the functions described for the various computer nodes of FIG. 2 could be distributed differently. For instance, the functions of the payment enabler 240 and the transaction facilitator 230 could be combined into a single computer node. Similarly, the payment enabler 240 could incorporate the functions of any of the payment instrument processors 265 or disbursement instrument processors 260. Although each of computer nodes 270, 275, and 280 perform both payment functions and disbursement functions for a given type of financial instrument, two different computer nodes could perform the payment functions and the disbursement functions for a given type of financial instrument. Furthermore, an existing merchant credit card processing system could be modified to incorporate functions of the payment enabler 240 and the credit card transaction processor 290, thereby enabling consumer to consumer payments through credit cards.

Flow Charts for the Consumer-to-Consumer Payment Process

Figure 3:
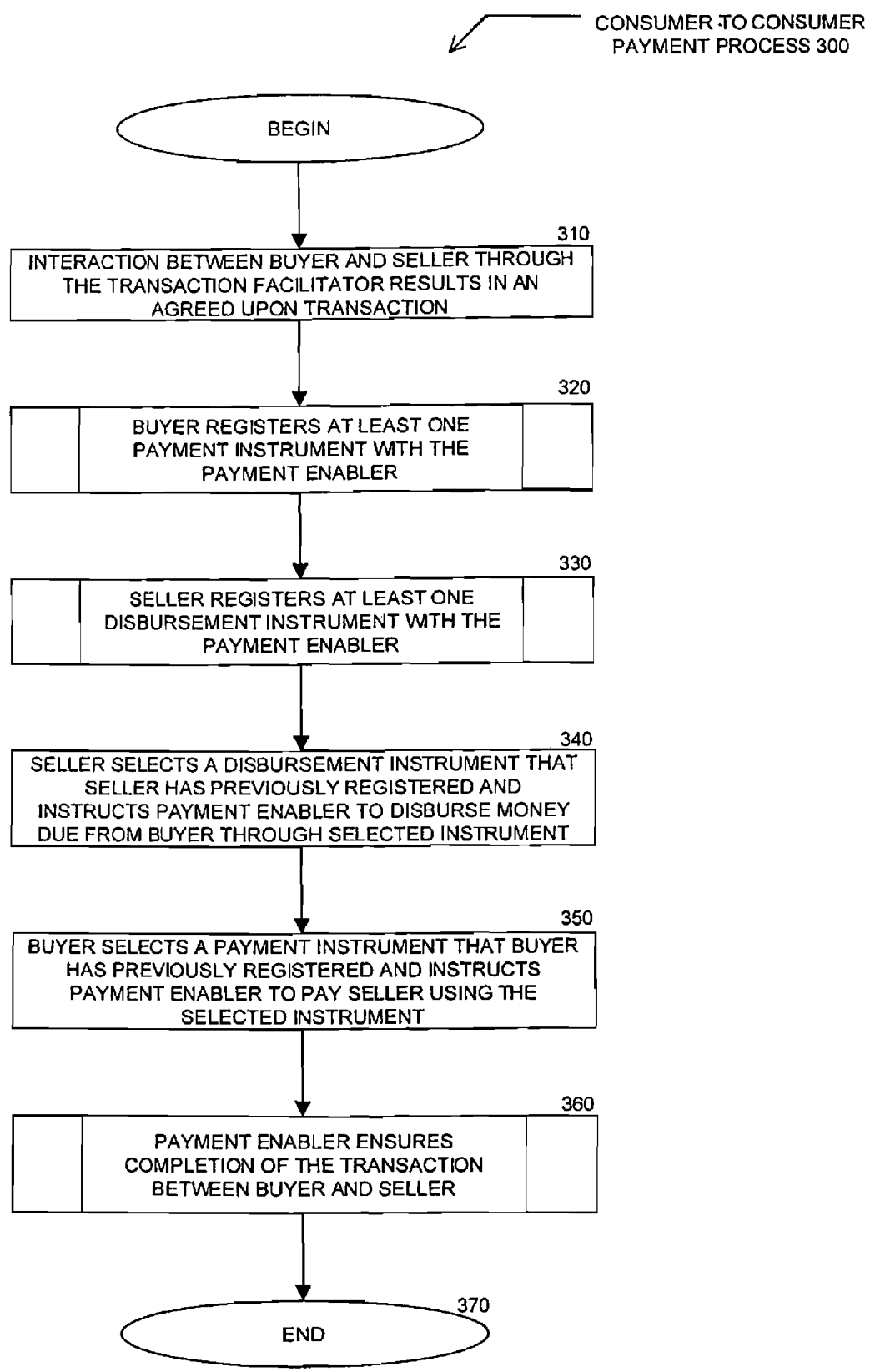
FIG. 3 is a flow chart illustrating the steps of a consumer-to-consumer process in accordance with an exemplary embodiment of the present invention.

FIG. 3 shows the steps of an exemplary consumer-to-consumer payment process 300. The process 300 begins with step 310, in which interaction between the buyer 110 and the seller 130 through the transaction facilitator 230 results in an agreed upon transaction for the sale of goods. The transaction facilitator 230 may, for example, be an online auction site, an online classifieds site, or any site which allows the seller 130 to sell goods to the buyer 110 without requiring that the seller 130 be registered as a merchant. Preferably, the transaction facilitator 230 automatically passes the transaction details to the payment enabler 240.

In step 320, the buyer 110 registers at least one payment instrument with the payment enabler 240. FIGS. 4A, 4B, 4C, 4D, and 4E describe the registration process for the various payment instruments available to the buyer 110.

Figure 5A:
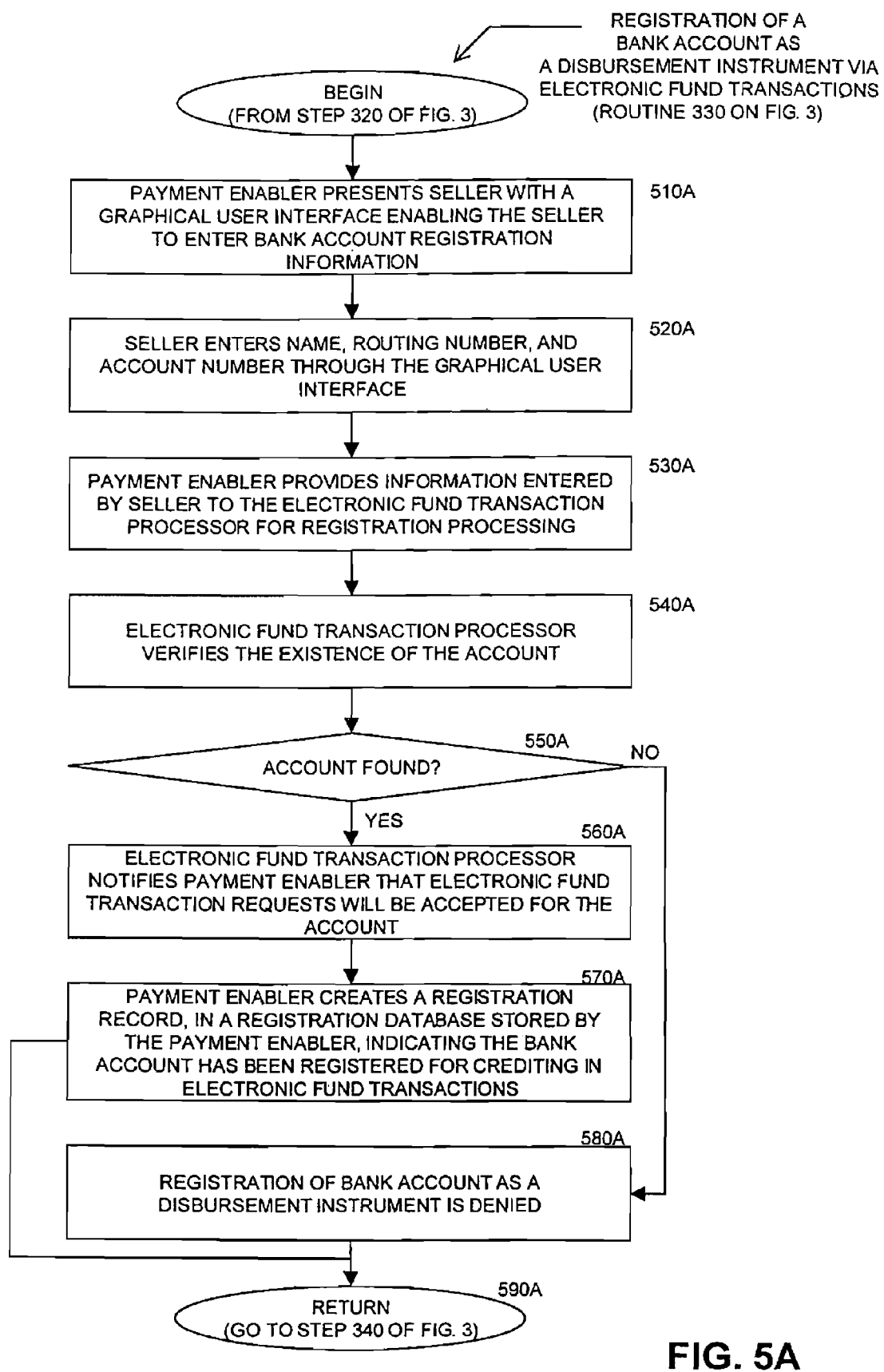
FIG. 5A is a flow chart illustrating a procedure for registration of bank account as a disbursement instrument via electronic fund transactions in accordance with an exemplary embodiment of the present invention.
Figure 5B:
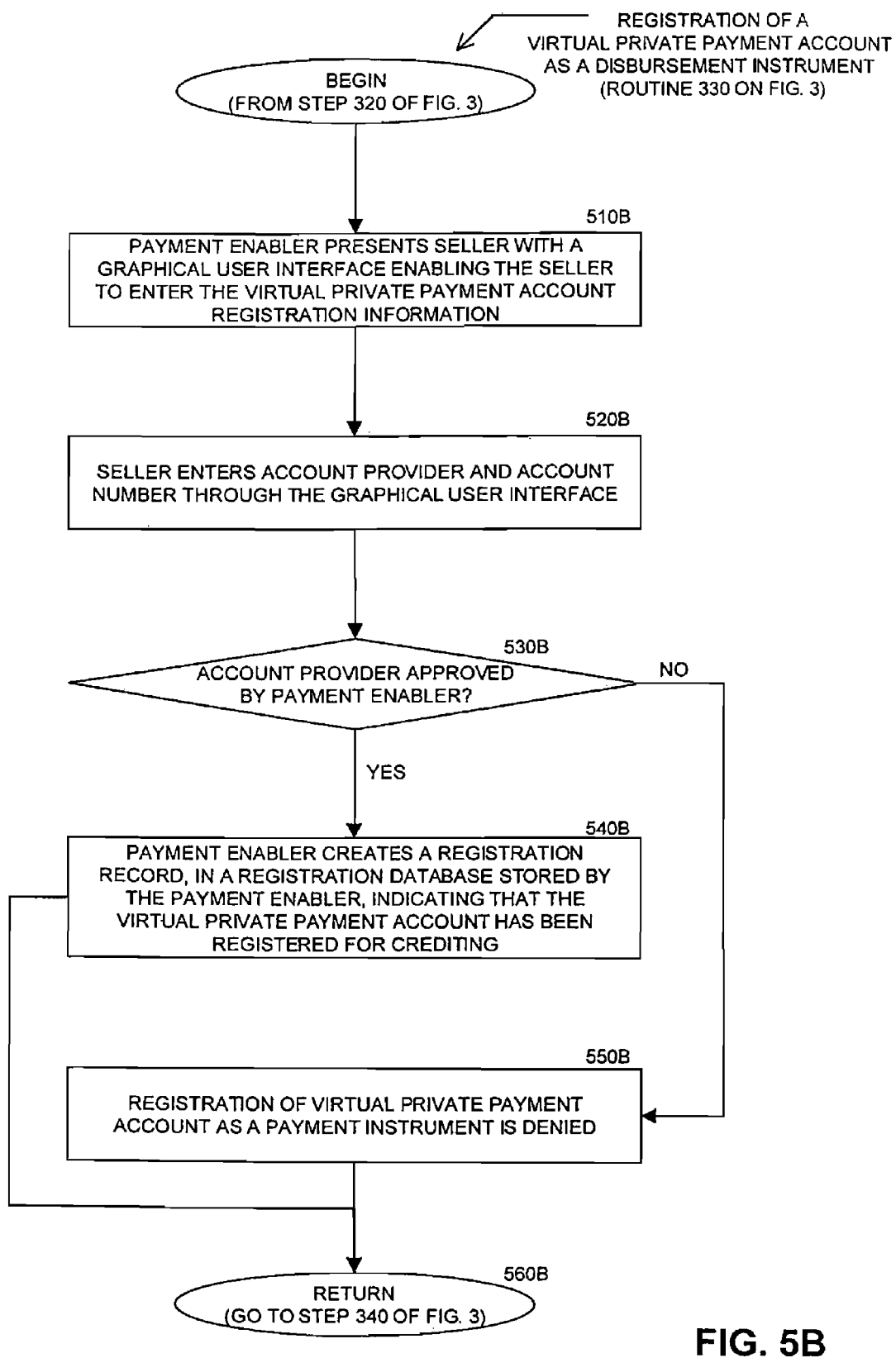
FIG. 5B is a flow chart illustrating a procedure for registration of a virtual private payment account as a disbursement instrument in accordance with an exemplary embodiment of the present invention.
Figure 5C:
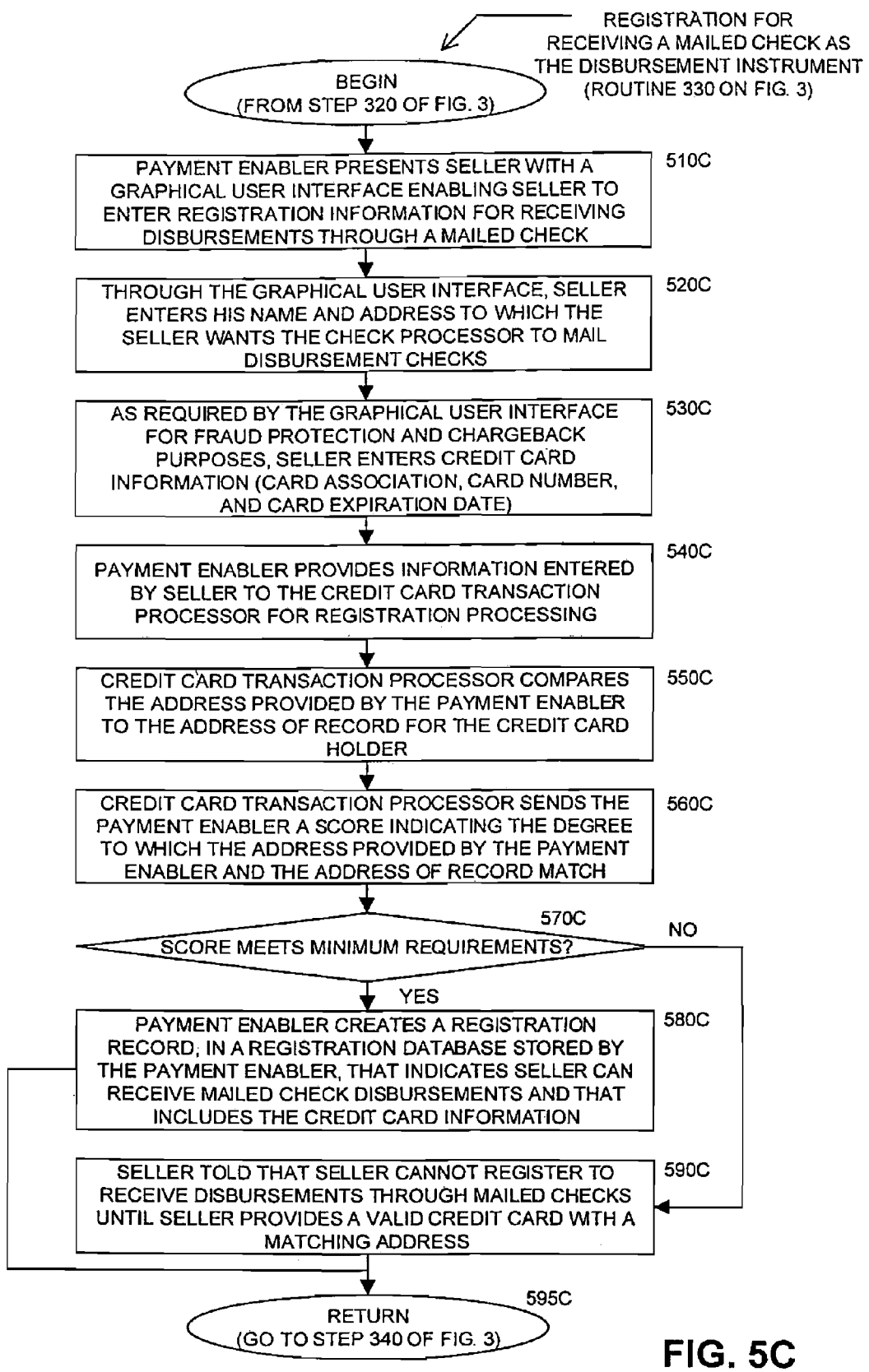
FIG. 5C is a flow chart illustrating a procedure for registration of a paper check as a disbursement instrument in accordance with an exemplary embodiment of the present invention.

In step 330, the seller 130 registers at least one disbursement instrument with the payment enabler 240. FIGS. 5A, 5B, and 5C describe the registration process for the various disbursement instruments available to the seller 130.

In step 340, the seller 130 selects a disbursement instrument that the seller has previously registered. The seller 130 then instructs the payment enabler 240 to disburse money due from the buyer 110 through the selected instrument.

In step 350, the buyer 110 selects a payment instrument that the buyer 110 has previously registered. The buyer 110 then instructs the payment enabler 240 to pay the seller 130 using the selected instrument.

In step 360, the payment enabler 240 ensures completion of the transaction between the buyer 110 and the seller 130. The process 300 then ends in step 370.

FIG. 4A is a logical flow diagram illustrating the steps in an exemplary process for the registration of a flash cash deposit as a payment instrument. The buyer 110 may follow this routine in step 320 of FIG. 3.

The routine begins at step 410A, in which the payment enabler 240 presents the buyer 110 with a graphical user interface enabling the buyer 110 to enter a deposit amount and information identifying the buyer. In step 420A, the buyer 110 enters the requested information through the graphical user interface.

In step 430A, the payment enabler 240 creates a registration record for the flash cash deposit in a registration database stored by the payment enabler 240. The registration record for the flash cash deposit stores identification information for the flash cash deposit instrument and indicates when the buyer 110 has made the cash deposit in order to complete registration of the flash cash instrument.

In step 440A, the payment enabler 240 stores a flag in the registration record to indicate that buyer 110 has not yet made the deposit. In step 450A, the payment enabler 240 provides the flash cash processor 285 with identification information for the buyer 110 and the deposit amount. The flash cash processor 285 stores this information in its own database.

In step 460A, the buyer 110 physically goes to a deposit location registered with the flash cash processor 285. At the deposit location, the buyer 110 deposits cash in the amount previously specified when setting up the deposit with the payment enabler 240.

In step 470A, the deposit location electronically notifies the flash cash processor 285 that the buyer 110 has completed the prearranged deposit. In step 480A, the flash cash processor 285 notifies the payment enabler 240 that the buyer 110 has completed the prearranged deposit.

Upon notification that the buyer 110 has completed the prearranged deposit, in step 490A, the payment enabler 240 updates the flag in the registration record to indicate that the buyer 110 has completed the deposit. The routine then returns in step 495A.

Figure 4B:
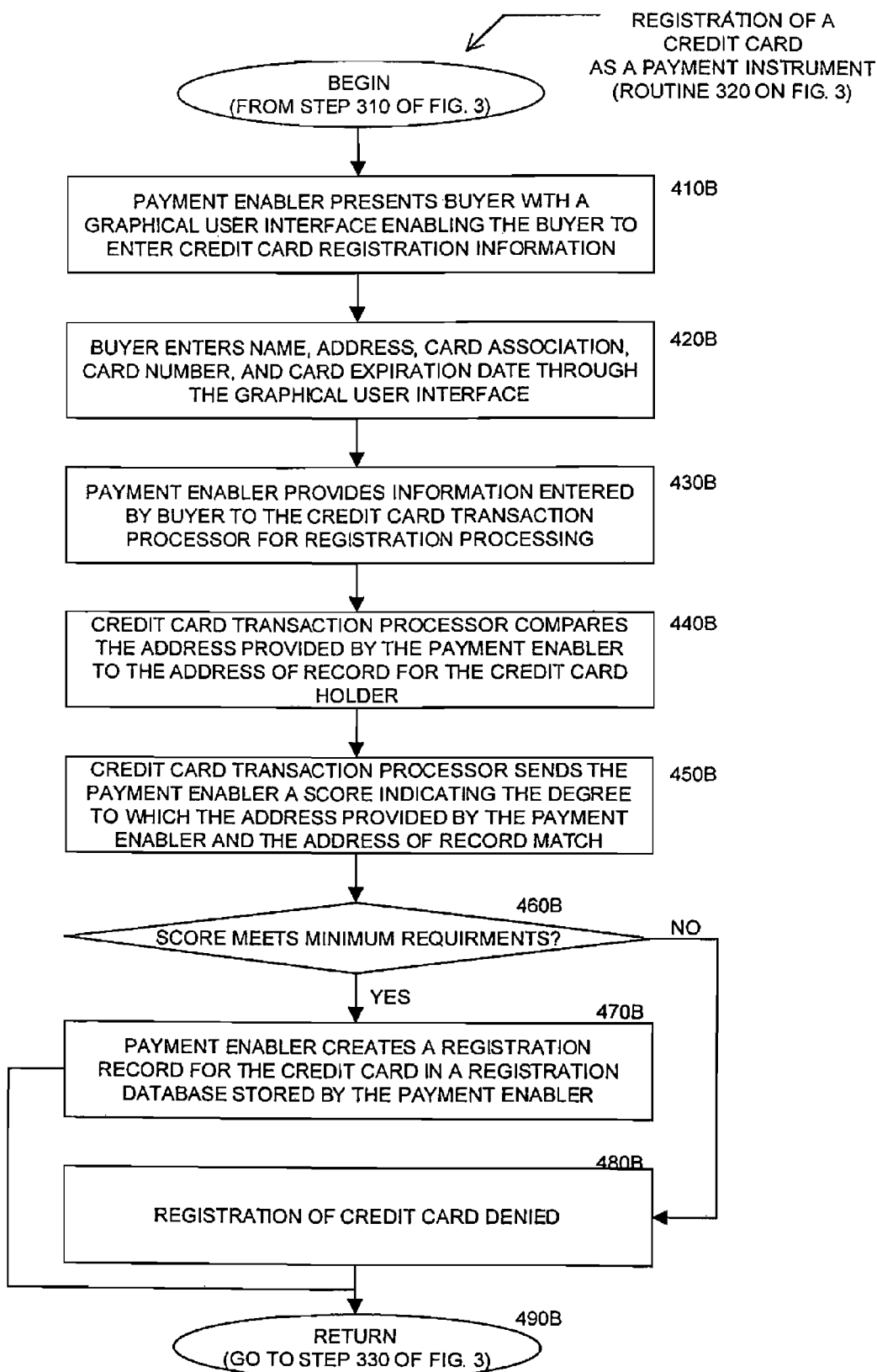
FIG. 4B is a flow chart illustrating a procedure for registration of credit card as a payment instrument in accordance with an exemplary embodiment of the present invention.

FIG. 4B is a logical flow diagram illustrating the steps in an exemplary procedure for the registration of a credit card as a payment instrument. The buyer 110 may follow this routine in step 320 of FIG. 3.

The routine begins with step 410B, in which the payment enabler 240 presents the buyer 110 with a graphical user interface enabling the buyer 110 to enter credit card registration information. In step 420B, the buyer 110 enters his name, address, card association, card number, and card expiration date through the graphical user interface.

In step 430B, the payment enabler 240 provides the information entered by the buyer 110 to the credit card transaction processor 290 for registration processing. In step 440B, the credit card transaction processor 290 compares the address provided by the payment enabler 240 to the address of record for the credit card holder. Instead of performing the address verification comparison at the credit card transaction processor 290, the credit card transaction processor may forward the registration information entered by the buyer 110 to the credit card issuer, which performs the address comparison and reports the results of the comparison back to the credit card transaction processor.

In step 450B, the credit card transaction processor 290 sends the payment enabler 240 a score indicating the degree to which the address provided by the payment enabler 240 and the address of record match. Such address matching analyses are known to those skilled in the art.

In step 460B, the payment enabler 240 determines if the address matching score meets minimum requirements for registration. If the score does not meet the minimum requirements for registration, the "NO" branch is followed to step 480B. In step 480B, registration of the credit card is denied, and the routine returns in step 490B.

Referring again to step 460B, if the score does meet minimum requirements for registration, then the "YES" branch is followed to step 470B. In step 470B, the payment enabler 240 creates a registration record for the credit card. The registration record is stored in a registration database at the payment enabler 240. The routine then returns in step 490B.

Figure 4C:
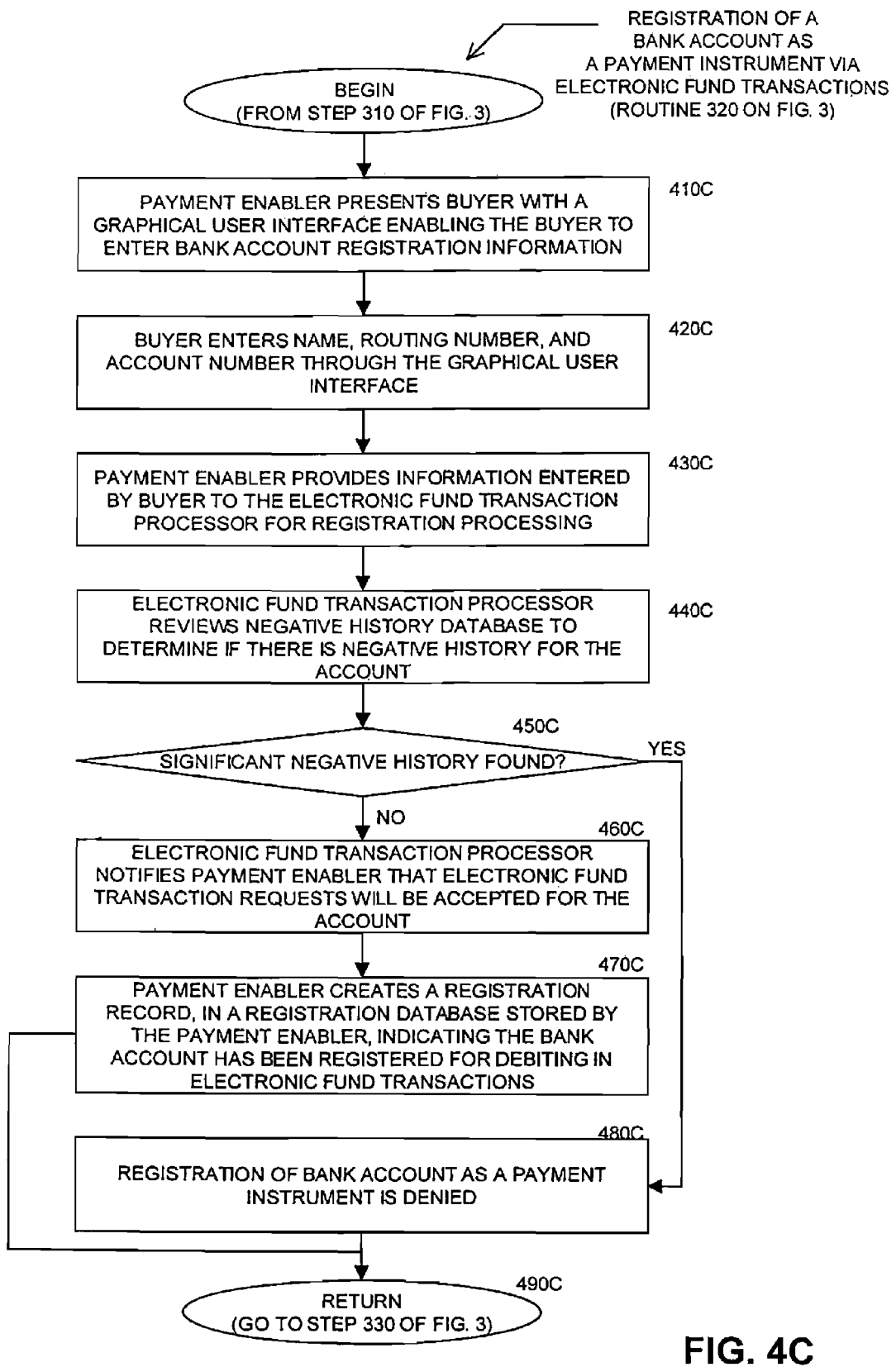
FIG. 4C is a flow chart illustrating a procedure for registration of bank account as a payment instrument via electronic fund transactions in accordance with an exemplary embodiment of the present invention.

FIG. 4C is a logical flow diagram illustrating the steps in an exemplary process for registration of a bank account as a payment instrument via electronic fund transactions. The buyer 110 may follow this routine in step 320 of FIG. 3.

The routine begins with step 410C, in which the payment enabler 240 presents the buyer 110 with the graphical user interface enabling the buyer 110 to enter bank account registration information. In step 420C, the buyer 110 enters his name. The buyer 110 also enters the routing number and account number for the bank account the buyer 110 wishes to register.

In step 430C, the payment enabler 240 provides information entered by the buyer 110 to the electronic fund transaction processor 270 for registration processing. In step 440C, the electronic fund transaction processor 270 processes the registration information by reviewing a negative history database to determine if there is negative history for the account. Such a negative history review is known to those skilled in the art.

In step 450C, the electronic fund transaction processor 270 determines if significant negative history has been found. If significant negative history has been found, the "YES" branch is followed to step 480C, and registration of the bank account as a payment instrument is denied. In this case, the routine returns in step 490C.

Referring again to step 450C, if significant negative history is not found, then the "NO" branch is followed to step 460C. In step 460C, the electronic fund transaction processor 270 notifies the payment enabler 240 that transaction requests will be accepted for the bank account.

In step 470C, the payment enabler 240 creates a registration record indicating that the bank account has been registered for debiting in electronic fund transactions. This registration record is stored in a registration database at the payment enabler 240. The routine then returns in step 490C.

Figure 4D:
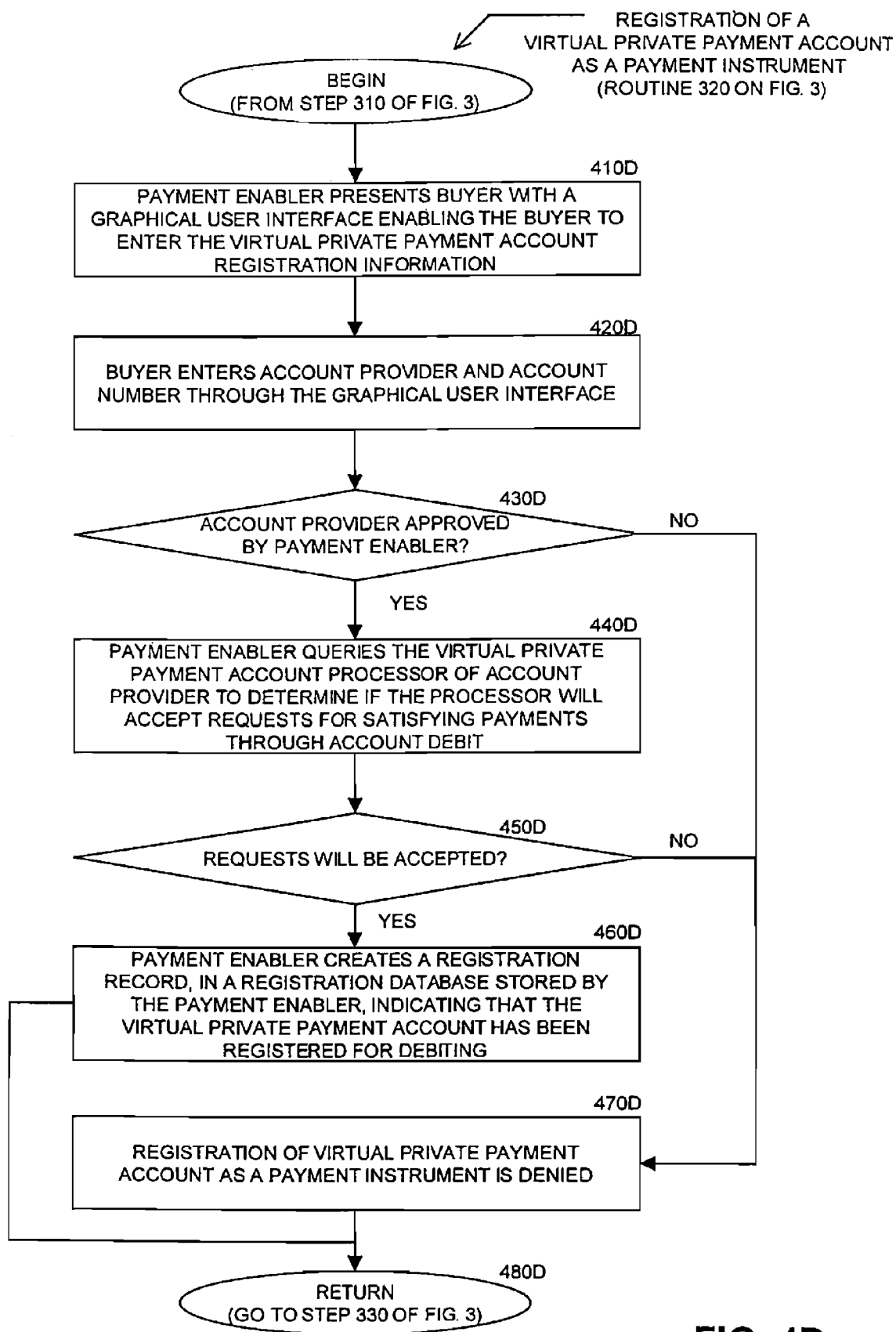
FIG. 4D is a flow chart illustrating a procedure for registration of virtual private payment account as a payment instrument in accordance with an exemplary embodiment of the present invention.

FIG. 4D is a logical flow diagram illustrating the steps in an exemplary process for the registration of a virtual private payment account as a payment instrument. The buyer 110 may follow this routine in step 320 of FIG. 3.

The routine begins in step 410D, in which the payment enabler 240 presents the buyer 110 with a graphical user interface enabling the buyer 110 to enter the virtual private payment account registration information. In step 420D, the buyer 110 enters the account provider and the account number for the virtual private payment account. The buyer 110 enters this information through the graphical user interface presented to the buyer in step 410D.

In step 430D, the payment enabler 240 determines if the account provider has been approved by the payment enabler 240. If the account provider has not been approved by the payment enabler 240, then the "NO" branch is followed to step 470D, in which registration of the virtual private payment account as a payment instrument is denied. In that case, the routine returns in step 480D.

Referring again to step 430D, if the payment enabler 240 determines that the account provider has been approved by the payment enabler 240, then the "YES" branch is followed to step 440D. In step 440D, the payment enabler 240 queries the virtual private payment account processor 275 of the account provider to determine if the processor will accept requests for debiting the virtual private payment account. The virtual private payment account processor 275, in response, notifies the payment enabler 240 if such requests will be accepted.

In step 450D, the payment enabler 240 determines if these requests will be accepted. If requests for debiting the virtual private payment account will not be accepted, then the "NO" branch is followed to step 470D, in which registration of the virtual private payment account is a payment instrument is denied. The routine then returns in step 480D.

Referring again to step 450D, if the payment enabler 240 is told by the virtual private payment account processor 275 that requests for debiting the virtual private payment account will be accepted, then the "YES" branch is followed to step 460D. In step 460D, the payment enabler 240 creates a registration record that indicates that the virtual private payment account has been registered for debiting. The payment enabler 240 stores this registration record in a registration database at the payment enabler 240. The routine then returns in step 480D.

Figure 4E:
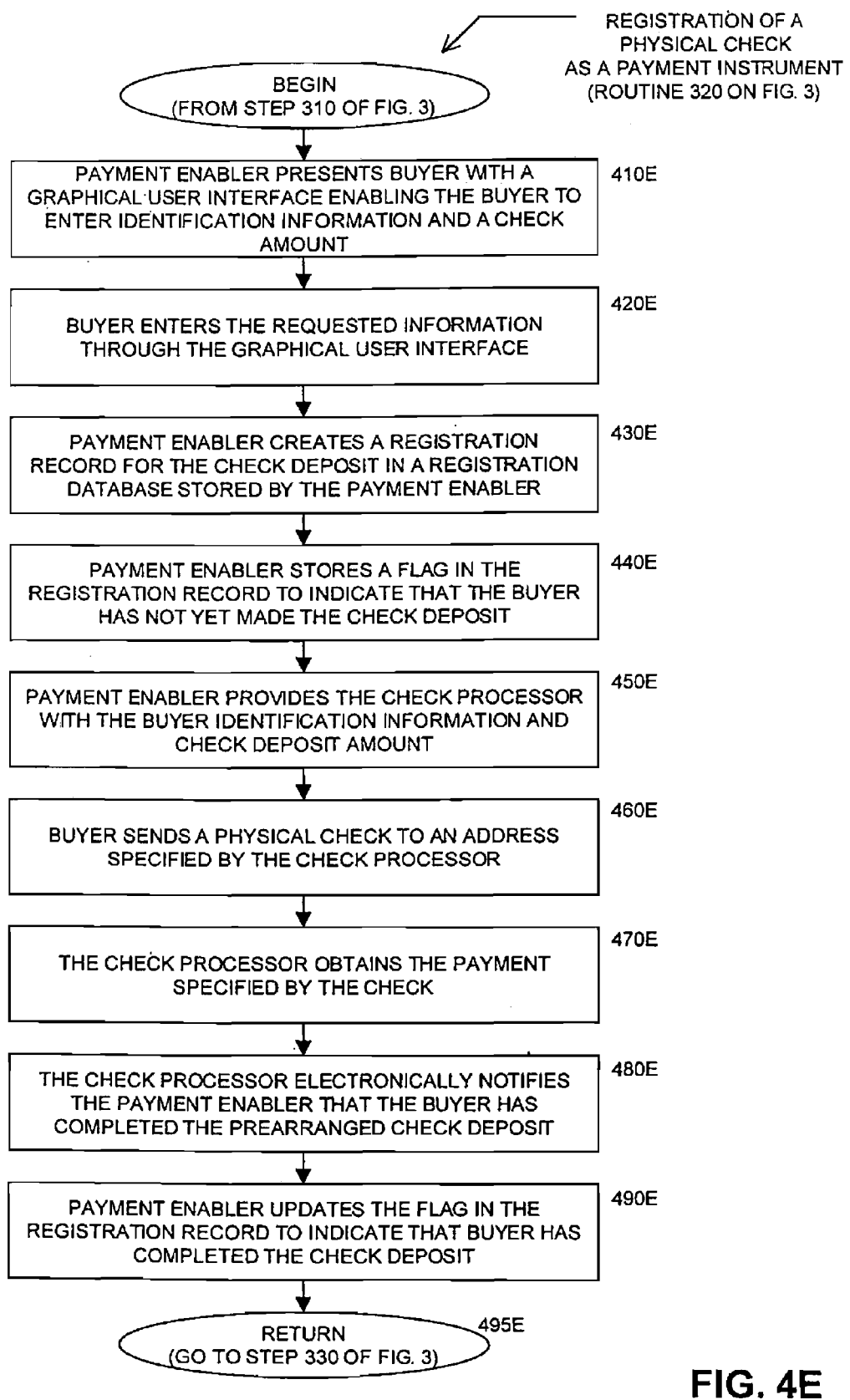
FIG. 4E is a flow chart illustrating a procedure for registration of a paper check as a payment instrument in accordance with an exemplary embodiment of the present invention.

FIG. 4E is a logical flow diagram illustrating the steps in an exemplary process for the registration of a physical check as a payment instrument. The buyer 110 may follow this routine in step 320 of FIG. 3.

In step 410E, the payment enabler 240 presents the buyer 110 with the graphical user interface enabling the buyer 110 to enter identification information and a check amount. In step 420E, the buyer 110 enters the requested information through the graphical user interface.

In step 430E, the payment enabler 240 creates a registration record for the check deposit in a registration database stored by the payment enabler 240. In step 440E, the payment enabler 240 stores a flag in the registration record to indicate that the buyer 110 has not yet made the check deposit.

In step 450E, the payment enabler 240 provides the check processor 280 with identification information for the buyer 110 and the check deposit amount. The check processor 280 stores this information and awaits receipt of the check from the buyer 110.

In step 460E, the buyer 110 sends a physical check to an address specified by the check processor 280. In step 470E, the check arrives at the address specified by the check processor 280. The check processor 280 processes the check and obtains the payment specified by the check.

In step 480E, the check processor 280 electronically notifies the payment enabler 240 that the buyer 110 has completed the prearranged check deposit. In step 490E, the payment enabler 240 updates the flag in the registration record to indicate that the buyer 110 has completed the check deposit. The routine then returns in step 495E.

FIG. 5A is a logical flow diagram illustrating the steps in an exemplary process for the registration of a bank account as a disbursement instrument via electronic fund transactions. The seller 130 may follow this routine in step 330 of FIG. 3.

In step 510A, the payment enabler 240 presents the seller 130 with a graphical user interface enabling the seller 130 to enter bank account registration information. In step 520A, the seller 130 enters the seller's name. The seller 130 also enters the routing number and account number for the bank account. The seller 130 enters this information through the graphical user interface presented to the seller in step 510A.

In step 530A, the payment enabler 240 provides the information entered by the seller 130 to the electronic fund transaction processor 270 for registration processing. In step 540A, the electronic fund transaction processor 270 verifies the existence of the account and notifies the payment enabler 240 if the account exists.

In step 550A, the payment enabler 240 determines if the payment enabler was notified that the account was found. If the account was not found, then the "NO" branch is followed to step 580A, and registration of the bank account as a disbursement instrument is denied. The routine then returns in step 590A.

Referring again to step 550A, if the bank account was found, then the "YES" branch is followed to step 560A. In step 560A, the electronic fund transaction processor 270 notifies the payment enabler 240 that the electronic fund transaction requests will be accepted for the bank account.

In step 570A, the payment enabler 240 creates a registration record indicating that the bank account has been registered for crediting in electronic fund transactions. This registration record is stored in the database at the payment enabler 240. The routine then returns in step 590A.

FIG. 5B is a logical flow diagram illustrating the steps in an exemplary process for registration of a virtual private payment account as a disbursement instrument. The seller 130 may follow this routine in step 330 of FIG. 3.

The routine begins in step 510B, in which the payment enabler 240 presents the seller 130 with a graphical user interface enabling the seller 130 to enter the virtual private payment account registration information. In step 520B, the seller 130 enters the account provider and the account number for the virtual private payment account. The seller 130 enters this information through the graphical user interface presented to the seller in step 510B.

In step 530B, the payment enabler 240 determines if the account provider entered by the seller 130 has been approved by the payment enabler 240. If the account provider has not been approved by the payment enabler 240, then the "NO" branch is followed to step 550B. In step 550B, registration of the virtual private payment account as a payment instrument is denied. The procedure then returns in step 560B.

Referring again to step 530B, if the account provider has been approved by the payment enabler 240, then the "YES" branch is followed to step 540B. In step 540B, the payment enabler 240 creates a registration record indicating that the virtual private payment account has been registered for crediting. The registration record is stored in a database at the payment enabler 240. The routine then returns in step 560B.

FIG. 5C is a logical flow diagram illustrating the steps in an exemplary process for registration of a mailed check as the disbursement instrument. The seller 130 may follow this routine in step 330 of FIG. 3.

The routine begins in step 510C, in which the payment enabler 240 presents the seller 130 with a graphical user interface enabling the seller 130 to enter registration information for receiving disbursements through a mailed check. In step 520C, the seller 130 uses the graphical user interface to enter the seller's name and the address to which the seller wants the check processor 280 to mail disbursement checks.

In order to register to receive a mailed check disbursement instrument, the payment enabler 240 also requires that the seller 130 register a credit card. Registration of a credit card provides protection to the intermediary 120 because the payment enabler 240 can charge the credit card in order to refund the buyer 110 should the seller 130 cash the disbursement check and disappear in a fraudulent transaction. The credit card can also be used to refund the buyer 110 in the event of a chargeback. Thus, in step 530C, the payment enabler 240 requires the seller 130 to enter credit card information, including the card association of the credit card, the card number, and the card expiration date. The seller 130 enters this information through a graphical user interface provided by the payment enabler 240.

In step 540C, the payment enabler 240 provides the information entered by the seller 130 to the credit card transaction processor 290 for registration processing. In step 550C, the credit card transaction processor 290 compares the address provided by the payment enabler 240 to the address of record for the credit card holder. Instead of performing the address verification comparison at the credit card transaction processor 290, the credit card transaction processor may forward the registration information entered by the buyer 110 to the credit card issuer, which performs the address comparison and reports the results of the comparison back to the credit card transaction processor. In step 560C, the credit card transaction processor 290 sends the payment enabler 240 a score indicating the degree to which the address provided by the payment enabler 240 matches the address of record for the credit card holder.

In step 570C, the payment enabler 240 determines if the score meets minimum requirements for registration of the credit card. If the score does not meet the minimum requirements for registration, then the "NO" branch is followed to step 590C, and the payment enabler 240 tells the seller 130 that the seller cannot register to receive disbursements through mailed checks until the seller provides a valid credit card with a matching address. The routine then returns in step 595C.

Referring again to step 570C, if the score returned by the credit card transaction processor 290 does meet minimum requirements for credit card registration, then the "YES" branch is followed to step 580C. In step 580C, the payment enabler 240 creates a registration record that indicates that the seller 130 can receive mailed check disbursements. This record includes the address to which the check disbursement should be mailed, as well as the credit card information needed to protect against fraud and to enable chargebacks. This registration record is stored in a database at the payment enabler 240. The routine then returns in step 595C.

Figure 6:
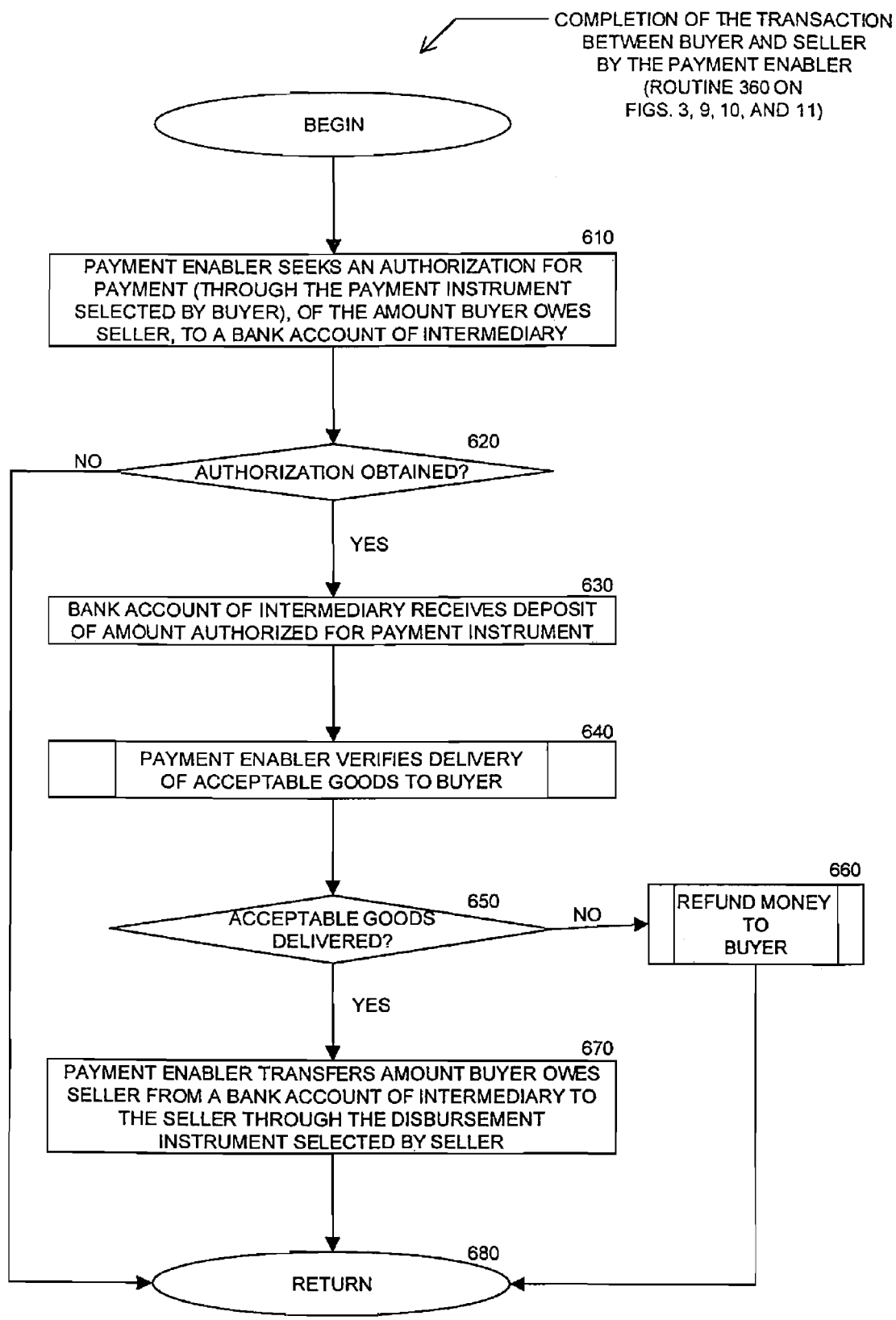
FIG. 6 is a flow chart illustrating steps the payment enabler can follow to complete the transaction between the buyer and the seller in accordance with an exemplary embodiment of the present invention.

FIG. 6 is a logical flow diagram illustrating exemplary steps for completing routine 360 on FIG. 3. Routine 360 also appears on FIGS. 9, 10 and 11. The routine 360 contains exemplary steps that the payment enabler 240 can follow to ensure completion of the transaction between the buyer 110 and the seller 130.

Routine 360 begins with step 610. In step 610, the payment enabler 240 seeks an authorization for payment of the amount buyer 110 owes seller 130. The payment enabler 240 seeks this authorization from the payment instrument processor 265 associated with the payment instrument selected by the buyer 110. The payment enabler 240 notifies the payment instrument processor 265 that the recipient of the authorized payment should be a bank account of the intermediary 120.

Generally, authorization refers to the point at which the payment enabler 240 passes the risk of non-payment by the buyer 110 to the entity running the payment instrument processor 265 from which authorization is sought. For flash cash, authorization is defined at which the flash cash processor 285 notifies the payment enabler 240 that the buyer 110 has completed the prearranged deposit in step 480A of FIG. 4A. Thus, for flash cash, authorization automatically occurs during the registration process of FIG. 4A. Similarly, authorization for a physical check occurs automatically during the registration process of FIG. 4E in step 480E, in which the check processor 280 electronically notifies the payment enabler 240 that the buyer 110 has completed the prearranged check deposit. This is true even though the bank account of the intermediary 120 may not yet have received the associated payment.

For a credit card transaction, the authorization process is well understood by those skilled in the art. Specifically, the payment enabler 240 provides a payment request to the credit card transaction processor 290. This charge request includes the payment amount and the credit card information. In the manner known to those skilled in the art, the credit card transaction processor 290 determines whether or not to accept this charge, a decision typically based on the credit card's spending limit, the card's current balance, and the amount of the authorization request. If the charge is accepted by the credit card transaction processor 290, the credit card transaction processor 290 generates an authorization number, which the credit card transaction processor 290 provides to the payment enabler 240. Upon authorization, the intermediary 120 is assured payment, and the risk of loss has passed to the credit card transaction processor 290.

For payment by the buyer 110 through an electronic fund transaction, an authorization is also obtained through methods known to those skilled in the art. Specifically, the payment enabler 240 makes an electronic fund transaction request of the electronic fund transaction processor 270. This transaction request includes the dollar amount, as well as the routing number and the account number of the account to be debited. The electronic fund transaction processor 270 determines whether to grant the authorization based upon a number of factors, including the dollar amount of the debit request and the current account balance. If the electronic fund transaction processor 270 grants the authorization, the electronic fund transaction processor 270 assumes the risk of non-payment by the buyer 110 and notifies the payment enabler 240 that authorization is granted.

Authorization for a debiting of a virtual private payment account may occur in a manner analogous to debiting a bank account in an electronic fund transaction.

The payment enabler 240 may provide the buyer 110 with a predetermined number of attempts to obtain an authorization. Different attempts may be with the same instrument, or the different attempts may be with different instruments.

In step 620, the payment enabler 240 determines if an authorization was obtained for the payment instrument selected by the buyer 110. If authorization was not obtained, then the "NO" branch is followed to step 680, and the routine returns. If, in step 620, authorization was obtained, then the "YES" branch is followed to step 630.

Once authorization has been obtained, the intermediary 120 is assured payment because the payment enabler 240 has passed to another party the risk of non-payment by the buyer 110. Thus, the intermediary 120 obtains the amount due automatically at a later time. In step 630, the bank account of the intermediary 120 receives deposit of the amount authorized for the payment instrument. However, in the case of a transfer of money from a virtual private payment account of the buyer 110 to a virtual private payment account of the seller 130, the money need not pass through a bank account of the intermediary 120, but rather can occur directly at the request of the payment enabler 240.

The collection of money from the buyer 110 and the transfer of that money to the bank account of the intermediary 120 occurs in the manner known to those skilled in the art. In the case of flash cash, the flash cash processor 285 coordinates a direct deposit into the bank account of the intermediary 120. The credit card transaction processor 290 coordinates settlement in the typical way for credit cards. The electronic fund transaction processor 270 uses the automated clearing house to accomplish settlement. The virtual private payment account processor 275 generates settlement by debiting the virtual private payment account of the buyer 110 and generating a direct deposit into the bank account of the intermediary 120. The check processor 280 may also generate a direct deposit into the bank account of the intermediary 120 to remit payment to the intermediary 120.

In step 640, the payment enabler 240 verifies delivery of acceptable goods to the buyer 110. In step 650, the payment enabler 240 determines if the seller has delivered acceptable goods to the buyer 110. If acceptable goods have been delivered, then the "YES" branch is followed to step 670, in which the payment enabler 240 transfers the amount buyer 110 owes seller 130 from a bank account of the intermediary 120 to the seller through the disbursement instrument selected by the seller 130. The routine then returns in step 680.

The disbursement transfer in step 670 is accomplished in the manner known to those skilled in the art. For example, in the case of an electronic fund transaction, the payment enabler 240 generates a request to the electronic fund transaction processor 270 to credit the bank account of the seller 130 and debit the account of the intermediary 120. The electronic fund transaction processor 270 processes this request through the automated clearing house. In the case of a virtual private payment account selected as the disbursement instrument, the payment enabler 240 draws funds from the account of the intermediary 120 in order to pay the virtual private payment account host, which credits the virtual private payment account of seller 130. In the case of a physical check chosen as the disbursement instrument, the payment enabler 240 instructs the check processor 280 to cut a check drawn on a bank account of the intermediary 120.

Referring again to step 650, if the payment enabler 240 determines that acceptable goods have not been delivered, then the "NO" branch is followed to step 660. In step 660, the payment enabler 240 refunds the money to the buyer 110, possibly contingent upon the return of the unacceptable goods to the seller 130. The routine then returns in step 680.

Figure 7:
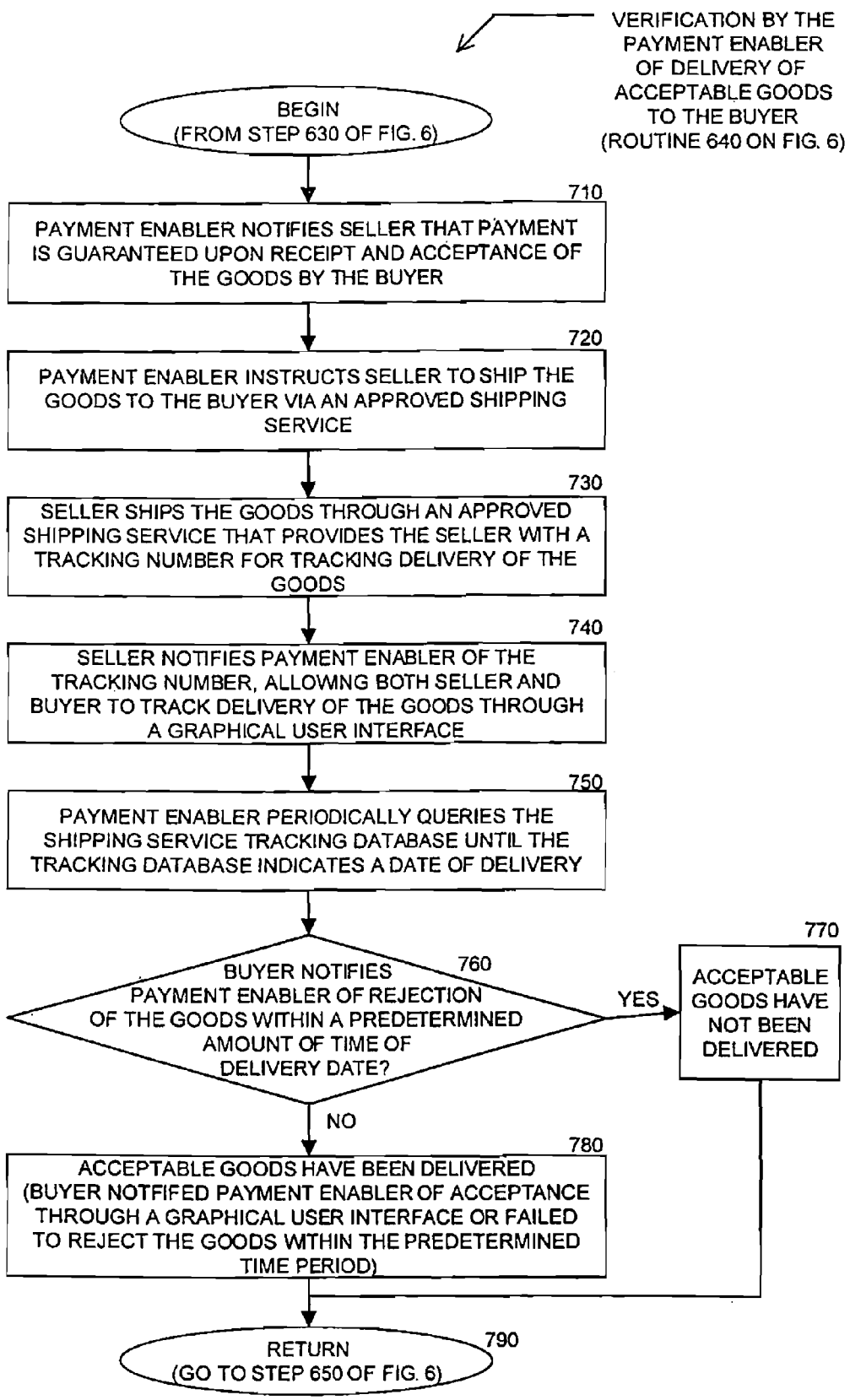
FIG. 7 is a flow chart illustrating steps the payment enabler can follow to verify delivery of acceptable goods to the buyer in accordance with an exemplary embodiment of the present invention.

FIG. 7 is a logical flow diagram illustrating exemplary steps for completing routine 640 on FIG. 6. In routine 640, the payment enabler 240 verifies the delivery of acceptable goods to the buyer 110.

The routine 640 begins with step 710, in which the payment enabler 240 notifies the seller 130 that payment is guaranteed upon receipt and acceptance of goods by the buyer 110. In step 720, the payment enabler 240 instructs the seller 130 to ship the goods to the buyer 110 via an approved shipping service.

In step 730, the seller 130 ships the goods through an approved shipping service that provides the seller with a tracking number for tracking delivery of the goods. In step 740, the seller 130 notifies the payment enabler 240 of the tracking number through a graphical user interface provided by the payment enabler. The payment enabler 240 then stores this tracking number.

The payment enabler 240 also provides an interface to both the buyer 110 and seller 130 that permits them to track the delivery of the goods through the shipping service. To get this information, the payment enabler 240 queries the shipping service tracking database 250 using the tracking number.

In step 750, the payment enabler 240 periodically queries the shipping service tracking database 250 until the database indicates a date of delivery of the goods to the buyer 110. Alternatively, the payment enabler 240 could register with the shipping service tracking database 250 so that the shipping service tracking database 250 can automatically notify the payment enabler 240 when the goods have been delivered to the buyer 110.

When using the consumer-to-consumer service of the payment enabler 240, the buyer 110 is informed that he should inform the payment enabler of his acceptance or rejection of the goods upon delivery. The buyer 110 is also warned that the goods will be deemed acceptable if the buyer 110 registers neither an acceptance nor a rejection of the goods within a predetermined amount of time of the delivery date. In step 760, the payment enabler 240 determines if the buyer 110 has notified the payment enabler 240 of rejection of the goods within a predetermined amount of time of the delivery date. If so, the "YES" branch is followed to step 770, in which the payment enabler 240 determines that acceptable goods have not been delivered. The routine then returns in step 790.

Referring again to step 760, if the payment enabler 240 determines that the buyer 110 has not notified the payment enabler of the rejection of good within a predetermined amount of time of the delivery date, then the "NO" branch is followed to step 780, in which the payment enabler 240 determines that acceptable goods have been delivered. In this case, the buyer 110 has notified the payment enabler 240 of the acceptance of goods through a graphical user interface or the buyer has failed to reject the goods within the predetermined time period. The routine then returns in step 790.

Figure 8:
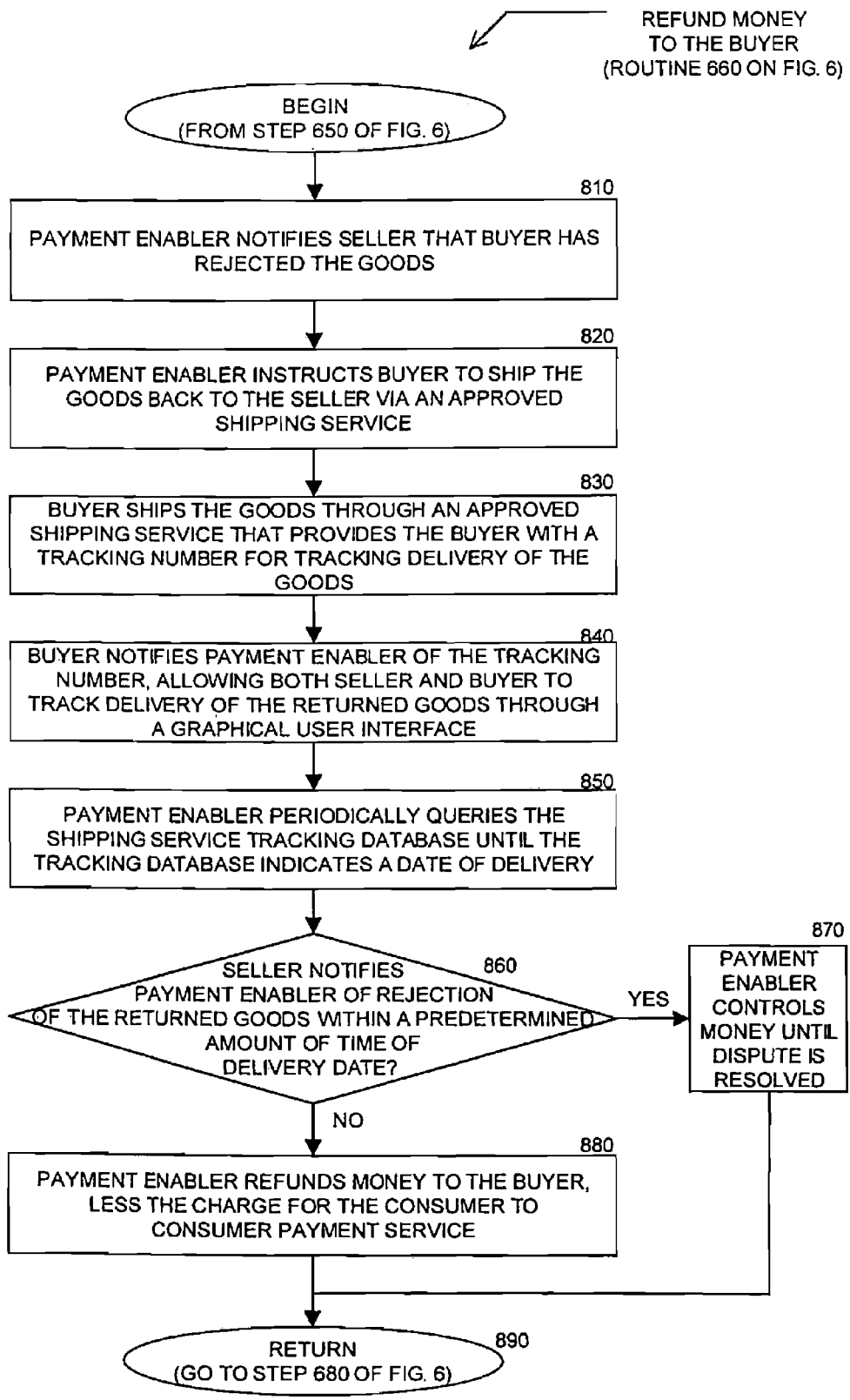
FIG. 8 is a flow chart illustrating steps for refunding money to the buyer in accordance with an exemplary embodiment of the present invention.

FIG. 8 is a logical flow diagram illustrating exemplary steps completed by routine 660 on FIG. 6. The routine 660 provides exemplary steps the payment enabler 240 can follow to refund money to the buyer 110 who has rejected the goods delivered by the seller.

The routine 660 begins with step 810, in which the payment enabler 240 notifies the seller 130 that the buyer 110 has rejected the goods. In step 820, the payment enabler 240 instructs the buyer 110 to ship the goods back to the seller 130 via an approved shipping service.

In step 830, the buyer 110 ships the goods via an approved shipping service that provides the buyer 110 with a tracking number for tracking delivery of the goods. In step 840, the buyer 110 notifies the payment enabler 240 of the tracking number, allowing both buyer 110 and seller 130 to track delivery of the returned goods through a graphical user interface.

In step 850, the payment enabler 240 periodically queries the shipping service tracking database 250 until the tracking database 250 indicates a date of delivery. In step 860, the payment enabler 240 determines if the seller 130 has notified the payment enabler of rejection of the returned goods within a predetermined amount of the time of the delivery date. If so, the "YES" branch is followed to step 870, and the payment enabler 240 refuses to make any further transfer of the money until the dispute is resolved. The routine then returns to step 890.

Referring again to step 860, if the seller 130 has not notified the payment enabler 240 of rejection of the goods within a predetermined amount of the time of the delivery date, then the "NO" branch is followed to step 880. In step 880, the payment enabler 240 refunds the money to the buyer 110, less the charge for the consumer-to-consumer payment service. The routine then returns in step 890.

Consumer-to-Consumer Payments in an Auction Environment

Figure 9:
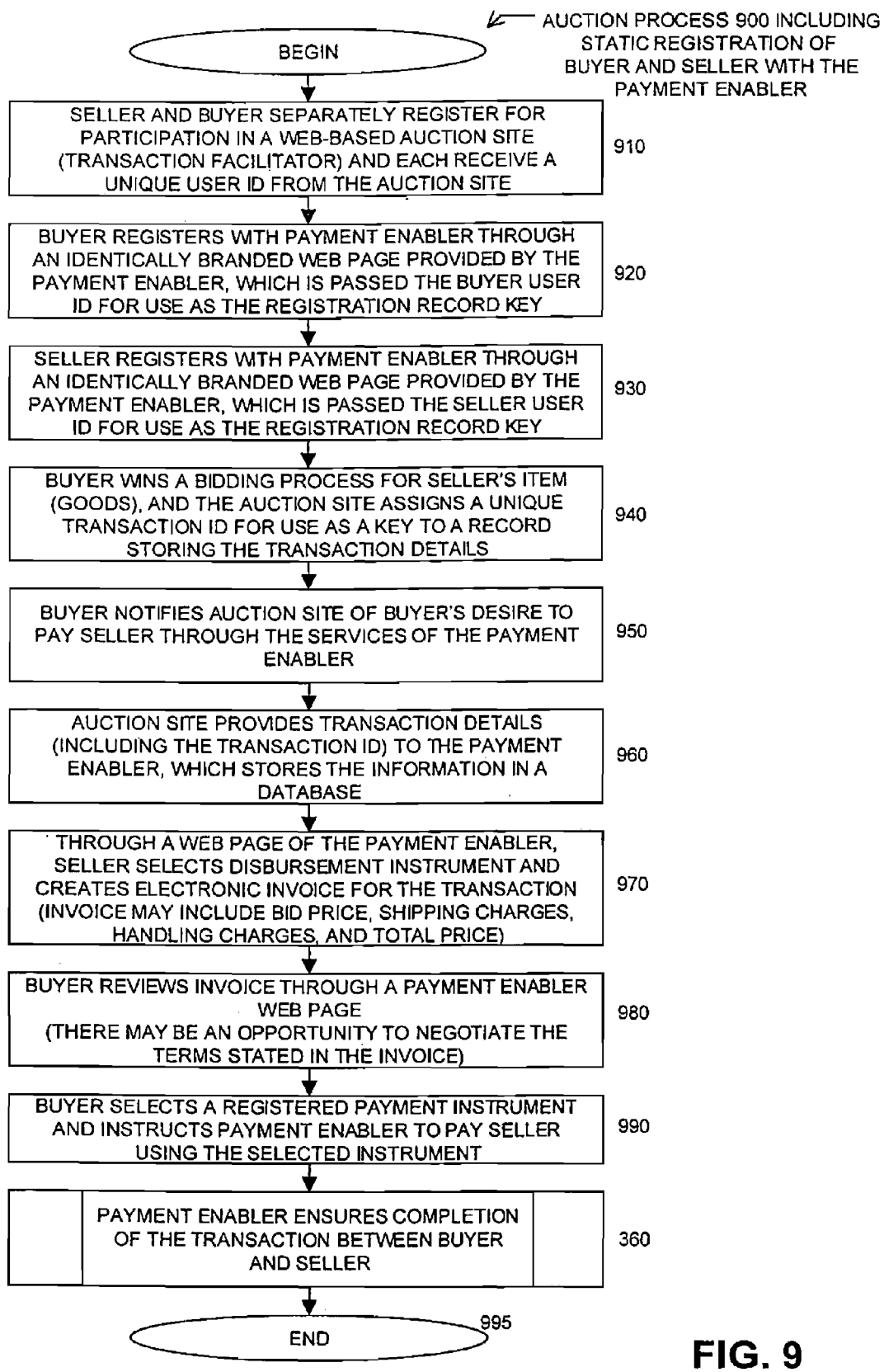
FIG. 9 is a flow chart illustrating the steps of an auction process that includes static registration of the buyer and the seller with the payment enabler in accordance with an exemplary embodiment of the present invention.

FIG. 9 is a logical flow diagram illustrating exemplary steps in an auction process 900 that includes consumer-to-consumer payments facilitated by the payment enabler 240. The process includes static registration of the buyer 110 and the seller 130 with the payment enabler 240.

The auction process may occur through any of the Web auction sites that are well-known to users of the Internet. A Web auction site, such as EBAY or YAHOO! AUCTION, allows a seller 130 to post an object for sale on the Web site. Numerous bidders then bid on the item on the Web site, leading to a single winning bidder, who becomes the buyer 110.

Static registration occurs when both the buyer 110 and the seller 130 register their financial instruments with the payment enabler 240 prior to the bidding process. In contrast, dynamic registration occurs when the buyer 110, the seller 130, or both the buyer 110 and the seller 130 register with the payment enabler 240 after the bidding process.

Registration with the payment enabler 240 need not be tied to any particular auction item. The registration process also need not be limited to registering a particular consumer as a buyer 110 or a seller 130. Specifically, any consumer registering with the payment enabler 240 may register to be a buyer 110, a seller 130, or both a buyer 110 and a seller 130, so long as the consumer registers appropriate payment or disbursement instruments. During registration, the consumer may register multiple payment instruments and multiple disbursement instruments. The consumer may also pick a preferred disbursement instrument and a preferred payment instrument, which the consumer can change when directing the payment enabler 240 to proceed with a specific transaction.

The auction process 900 begins with step 910, in which the buyer 110 and seller 130 separately register for participation in a Web-based auction site, which is the transaction facilitator 230 of FIG. 2. Registration with the auction site 230 is different from registration with the payment enabler 240 because registration simply enables the buyer 110 and seller 130 to participate in online auctions; no payment or disbursement instruments need to be registered at this point. Upon registration with the auction site, both the buyer 110 and the seller 130 receive a unique user ID from the auction site. This user ID identifies the buyer 110 and the seller 130 in any transactions in which they participate.

In step 920, the buyer 110 registers with the payment enabler 240 by specifying payment instruments. Typically, the buyer 110 is transferred to the registration Web page of the payment enabler 240 either by choosing a menu option that appears when the buyer logs onto the auction site 230 or by clicking on a hyperlink in an e-mail promoting the consumer-to-consumer payment service. Preferably, the Web page provided by the payment enabler 240 is branded identically with the auction site 230. Furthermore, the auction site 230 preferably passes the buyer user ID to the payment enabler 240 for use as the registration record key. By automatically passing this buyer user ID from the auction site 230 to the payment enabler 240, the payment enabler and the auction site can present an integrated experience to the buyer 110 in which the buyer never realizes he is at a different site.

In step 930, the seller 130 registers with the payment enabler 240 by specifying disbursement instruments. Typically, the seller 130 is transferred to the registration Web page of the payment enabler 240 either by choosing a menu option that appears when the seller logs onto the auction site 230 or by clicking on a hyperlink in an e-mail promoting the consumer-to-consumer payment service. Preferably, the Web page provided by the payment enabler 240 is branded identically with the auction site 230. Furthermore, the auction site 230 preferably passes the seller user ID to the payment enabler 240 for use as the registration record key. By automatically passing this seller user ID from the auction site 230 to the payment enabler 240, the payment enabler and the auction site can present an integrated experience to the seller 130 in which the seller never realizes he is at a different site.

In step 940, the bidding process occurs, and the buyer 110 wins the bidding process for the item (goods) of the seller 130. At this point, the auction site 230 assigns a unique transaction ID for use as a key to a record storing the transaction details. These transactions details include the item, the price, and the identification of the buyer 110 and the seller 130 through the buyer user ID and the seller user ID.

In step 950, the buyer 110 notifies the auction site of the desire of the buyer 110 to pay the seller 130 through the services of the payment enabler 240. The buyer 110 may be transferred to a Web page for performing this notification by clicking on a hyperlink in an e-mail notifying the buyer of his winning bid. Alternatively, the buyer 110 may discover he was the winning bidder by perusing recent transactions after logging onto the auction site 230, and the buyer may then choose a menu hyperlink to a Web page for notifying the auction site of a desire to use the consumer-to-consumer payment service.

In step 960, the auction site provides the transaction details to the payment enabler 240, which stores the information in a database. These details may include the transaction ID so that the auction site and the payment enabler 240 can communicate about the particular transaction.

Upon notification that the buyer 110 desires to pay the seller 130 through the services of the payment enabler 240, the seller selects a registered disbursement instrument in step 970. The seller 130 also creates an electronic invoice for the transaction through a Web page provided by the payment enabler 240. This invoice may include the bid price, the shipping charges, the handling charges, and the total price. Handling charges may be those fees charged by the payment enabler 240 for use of the consumer-to-consumer payment service.

The buyer 110 then learns from perusing his account or reading an e-mail that the invoice has been created. By clicking on a hyperlink in the e-mail or by navigating appropriately through the interface provided by the auction site 230, the buyer 110 directs his browser to the electronic invoice Web page of the payment enabler 240. In step 980, the buyer 110 reviews this invoice.

The buyer 110 may disagree with the terms stated in the invoice. For example, the buyer 110 may disagree with the shipping charges. If that is the case, there may be an opportunity for the buyer 110 to negotiate the terms stated in the invoice through electronic messages, sent either in e-mail form or through a Web site provided by the payment enabler 240, with the seller 130.

In step 990, the buyer 110 selects a registered payment instrument. By doing so, the buyer 110 also instructs the payment enabler 240 to pay the seller 130 using the selected instrument.

In step 360, the payment enabler 240 ensures completion of the transaction between the buyer 110 and the seller 130. The process 900 then ends in step 995.

Figure 10:
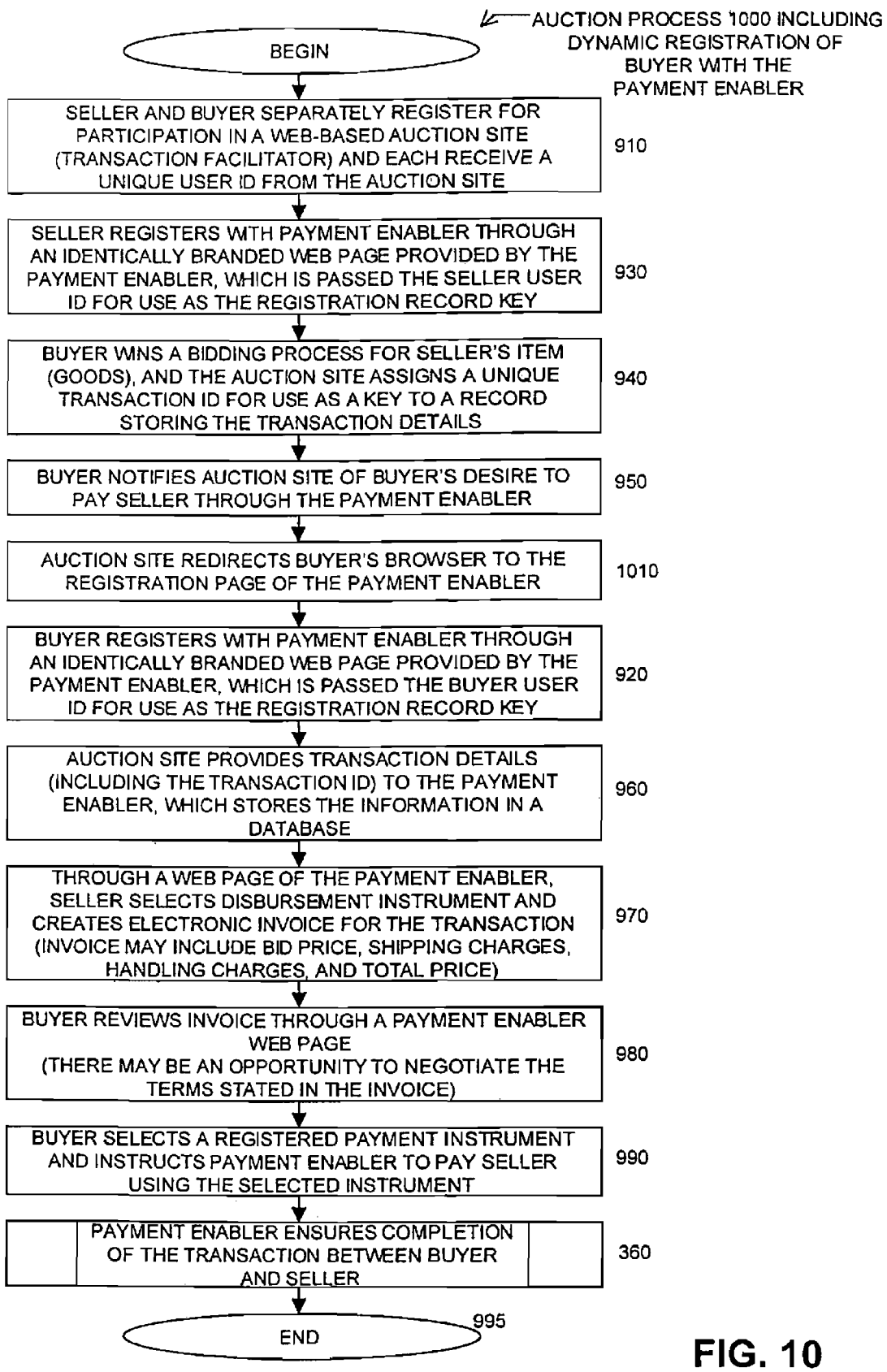
FIG. 10 is a flow chart illustrating the steps of an auction process that includes dynamic registration of the buyer with the payment enabler in accordance with an exemplary embodiment of the present invention.

FIG. 10 is a logical flow diagram illustrating the steps of an exemplary auction process 1000 that incorporates dynamic registration of the buyer 110 with the payment enabler 240. Auction process 1000 of FIG. 10 is similar to the auction process 900 of FIG. 9, except that in the auction process 1000, the buyer 110 registers with the payment enabler 240 after the bidding process, instead of before the bidding process.

Specifically, after the buyer 110 notifies the auction site in step 950 that the buyer wishes to pay the seller 130 through the payment enabler 240, the auction site in step 1010 then redirects the buyer's browser to the registration page of the payment enabler 240 so that the buyer can register. At that point, in step 920, the buyer 110 registers with the payment enabler 240 through an identically branded Web page provided by the payment enabler 240. After step 920, the auction process 1000 proceeds as in the auction process 900 of FIG. 9.

Figure 11:
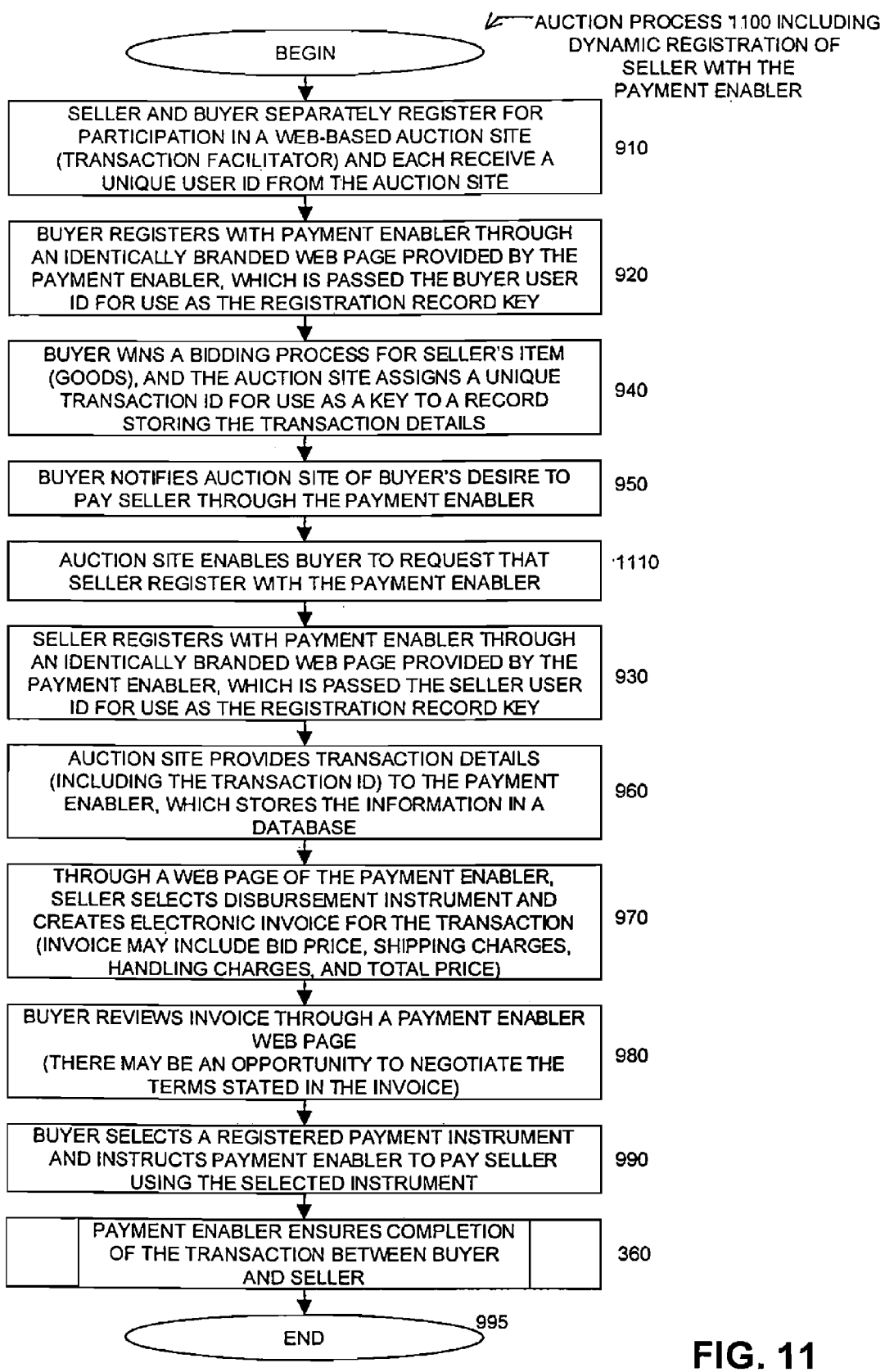
FIG. 11 is a flow chart illustrating the steps of an auction process that includes dynamic registration of the seller with the payment enabler in accordance with an exemplary embodiment of the present invention.

FIG. 11 is a logical flow diagram illustrating the steps of an exemplary auction process 1100 that incorporates dynamic registration of the seller 130 with the payment enabler 240. Again, the auction process 1100 of FIG. 11 is similar to the auction process 900 of FIG. 9, except that in the auction process 1100, the seller 130 registers with the payment enabler 240 after the bidding process, instead of before the bidding process.

Specifically, the buyer 110 wins the bidding in step 940. In step 950, the buyer 110 notifies the auction site of the buyer's desire to pay the seller 130 through the payment enabler 240. Then, in step 1110, the auction site 230 enables the buyer 110 to request that the seller 130 register with the payment enabler 240, because the seller 130 has not yet registered a disbursement instrument for receiving the buyer's payment. To notify the seller 130 of the request for registration by the buyer 110, the payment enabler 240 may send the seller an e-mail. The seller then registers with the payment enabler 240 in step 930. Subsequently, the auction process 1100 proceeds as in the auction process 900 of FIG. 9.

Therefore, a method for offering a consumer to consumer payment service over a computer network has been described. Other alternative embodiments will become apparent to those skilled in the art to which an exemplary embodiment pertains without departing from its spirit and scope. Accordingly, the scope of the present invention is defined by the appended claims rather than the foregoing description.

Personal Merchant Accounts

The consumer-to-consumer payment process 300 can be modified to provide a personal merchant account to an individual consumer. These personal merchant accounts may be managed by the payment enabler 240. Generally, a personal merchant account allows an individual seller 130 to create and manage an online cash register. Once the seller 130 has created the online cash register, any given buyer 110 may use the online cash register to pay the seller 130 for goods through any one of a variety of payment instrument types the seller has chosen to offer through the online cash register. In a typical embodiment, the online cash register is a Web page form for receiving payment instrument information.

The online cash register that the seller 130 creates through the seller's personal merchant account can facilitate transactions between the seller and multiple buyers. The personal merchant account can also provide the seller 130 with tools for managing these multiple transactions. Specifically, the personal merchant account may provide the seller with online backroom capabilities. Typically, the payment enabler 240 provides these backroom capabilities to the seller 130 through graphical user interfaces, such as Web pages.

These backroom capabilities enable the seller 130 to view information about all completed transactions for which the seller has been paid and all pending transactions for which the seller has not yet been paid. Also, the backroom capabilities may enable the seller 130 to view orders which the seller 130 needs to fulfill for customers. These backroom capabilities may further provide the seller 130 with tools for monitoring shipments of goods to the various buyers. Furthermore, the backroom capabilities may calculate the total revenues collected by the seller 130 through the online cash register. Other backroom capabilities, which are known to those skilled in the art, may be available through the personal merchant account.

Typically, the personal merchant account and the online cash register are integrated with the transaction facilitator 230. The transaction facilitator 230 may, for example, be an online auction site, an online classifieds site, or an online shopping mall at which the seller 130 has a virtual storefront for selling a variety of goods. Thus, the seller 130 may be referred to the payment enabler 240 for creation of the personal merchant account and the online cash register by the transaction facilitator 230. Similarly, the seller 130 may access the backroom capabilities of the seller's personal merchant account through a link from the transaction facilitator 230. Upon facilitating an agreement for the sale of goods from the seller 130 to the buyer 110, the transaction facilitator 230 may automatically send the buyer to the seller's online cash register in order to pay.

To create an online cash register, the seller 130 first determines what payment methods the seller wishes to offer through the online cash register. Typically, the seller 130 can select payment instrument types from a graphical user interface provided by the payment enabler 240. For each payment instrument type selected by the seller 130, the payment enabler 240 usually requires the seller to undergo an approval or underwriting process.

When creating the online cash register, the seller 130 also registers a disbursement instrument for receiving payment from the buyer 110. The procedure for registering a disbursement instrument may be analogous to any of the disbursement instrument registration procedures of FIGS. 5A-5C.

When creating the online cash register, the seller 130 typically also defines additional charges to be added to the price at which the seller agreed to sell goods to the buyer 110. Such additional charges may include sales tax, shipping charges, and handling charges (i.e., the money the payment enabler 240 charges for processing the payment of the buyer 110). Once the seller 130 has defined these additional charges, the online cash register automatically calculates these additional charges and a total price that includes the sale price of the goods plus the additional charges. The online cash register then presents a display of the sale price of the goods, the additional charges, and the total price to the buyer 110 for payment.

The additional charges may be predefined by the seller 130 through the use of tables or formulas. For example, the seller 130 may require sales tax to be calculated as a percentage of the sale price of the goods, and the seller may further define the percentage to be used in this calculation in a table that associates a percentage with each possible state in which the buyer 110 may live. Similarly, the seller 130 may define a table of shipping charges that vary depending on the weight of the item, the size of the item, and the address of the buyer 110. Alternatively, the seller 130 may manually enter the additional charges for a particular transaction after agreeing to sell goods to the buyer 110 for a specified price.

In order to limit the danger of fraud and chargebacks, the payment enabler 240 may require the seller 130 to undergo an underwriting or approval process before receiving a personal merchant account. This approval process may be similar to the approval process a retail business must undergo to become a merchant and may vary depending on the particular instrument type(s) that the seller wants to accept through the online cash register.

Typically, the payment enabler 240 retrieves information on which the approval decision is based through a graphical user interface provided to the seller 130 for creation of the online cash register. Furthermore, the payment enabler 240 may query additional sources based upon the information received from the seller 130 in order to obtain additional information that the payment enabler considers in the approval process. In determining whether or not to approve the seller 130 for the personal merchant account or for accepting payments through a particular payment instrument type, the payment enabler 240 may require the seller 130 to provide such information as the seller's name, address, social security number, e-mail address, estimated total sales for the products to be sold, type of products to be sold, how long the seller has been associated with the transaction facilitator 230, feedback received by the transaction facilitator 230 from customers of the seller, and the credit history of the seller. The payment enabler 240 may submit the information received from the seller 130 to a remote computer node (not shown) for performing the underwriting process.

The payment enabler 240 may make an automated decision whether or not to approve the seller 130 for the personal merchant account or for accepting a payment instrument type through an online cash register. The payment enabler 240 may base this automated decision upon information provided by the seller 130 to the payment enabler and further information about the seller that the payment enabler obtains from other sources.

Alternatively, the payment enabler 240 may determine that the seller 130 does not meet the criteria for either automated approval or automated rejection. In that case, the payment enabler 240 may refer the underwriting process to a human credit manager for further review. In this further review, the human credit manager may request additional information from the seller 130 or request additional information from other sources. After final decision, the human credit manager informs the payment enabler 240 whether or not to approve the seller 130 for the personal merchant account or for the payment instrument type under review.

When performing the underwriting assessment of the seller 130, the payment enabler 240 may rate the seller using tiered risk assessment criteria. For example, the payment enabler 240 may process the information provided by the seller 130 to determine if the seller is high risk, medium risk, or low risk for fraud and chargebacks. The payment enabler 240 may inform potential buyers of the tier into which the payment enabler has placed the seller 130, thereby helping a buyer 110 to determine whether or not to do business with the seller. Similarly, the tier into which the payment enabler 240 places the seller 130 for a particular payment instrument type may determine the maximum amount the seller 130 can receive through that payment instrument for any single transaction. Also, the tier into which the payment enabler 240 places the seller 130 may determine whether or not the payment enabler refers the underwriting process to a human credit manager.

After the seller 130 creates an online cash register, the seller 130 may then provide the online cash register to buyers in order to receive payment for the sale of goods. Also, the seller 130 may use the backroom capabilities of the personal merchant account to view transactions completed through the online cash register.

Handling of the payment process through the online cash register occurs in a manner analogous to that for the consumer-to-consumer payment process 300. The transaction facilitator 230 provides the payment enabler 240 with the details of a transaction between the buyer 110 and the seller 130. The payment enabler 240 then provides the online cash register for the seller 130 to the buyer 110. The online cash register displays the sale price of the goods the buyer 110 is buying from the seller 130. The online cash register also displays any additional charges the seller 130 wishes to charge the buyer 110. Further, the online cash register includes a form allowing the buyer 110 to pay the total price using any of the payment instrument types for which the seller 130 has sought and received approval.

In response to viewing the online cash register, the buyer 110 enters registration information for a payment instrument of one of the payment instrument types available through the online cash register. This registration process for the buyer 110 may be similar to the registration process shown in any of FIGS. 4A-4E, which are used in the consumer-to-consumer payment process 300. As with the consumer-to-consumer payment process 300, the payment enabler 240 may store the registration information for the payment instrument. In that way, the payment enabler 240 may process requests from the buyer 110 to pay the seller 130 without ever providing the registration information for the payment instrument to the seller. This eliminates any necessity for providing the seller 130 with a general authorization to charge payment instruments such as credit cards, thereby reducing the danger of fraud.

After registration of a payment instrument, the buyer 110 can then instruct the online cash register provided by the payment enabler 240 to pay the seller 130. The payment enabler 240 then obtains an authorization for a transfer of the total price indicated by the online cash register from the buyer 110 through the payment instrument to a first intermediary bank account of the intermediary 120. Next, the payment enabler 240 orders a transfer of the total price from a second intermediary bank account through a pre-registered disbursement instrument to the seller 130. The first intermediary bank account and the second intermediary bank account may be identical, or they may be owned by the same entity.

When the online cash register receives instructions from the buyer 110 to pay the seller 130 a total price indicated by the online cash register, the payment enabler 240 assigns the transaction a unique reference number. Through the backroom capabilities of the personal merchant account, the seller 130 can view pending and past transactions and their associated reference numbers. The seller 130 can also use this reference number to refer to the specific transaction when contacting the intermediary 120 to discuss a transaction, such as during fraud investigations and chargebacks.

Before, during, and after the online cash register's payment process, the payment enabler 240 may perform fraud detection analyses for detecting fraud by the buyer 110 or the seller 130. Such fraud detection methods are known to those skilled in the art. Preventing fraud may further include authenticating the buyer 110 and the seller 130 before processing a transaction.

Figure 12:
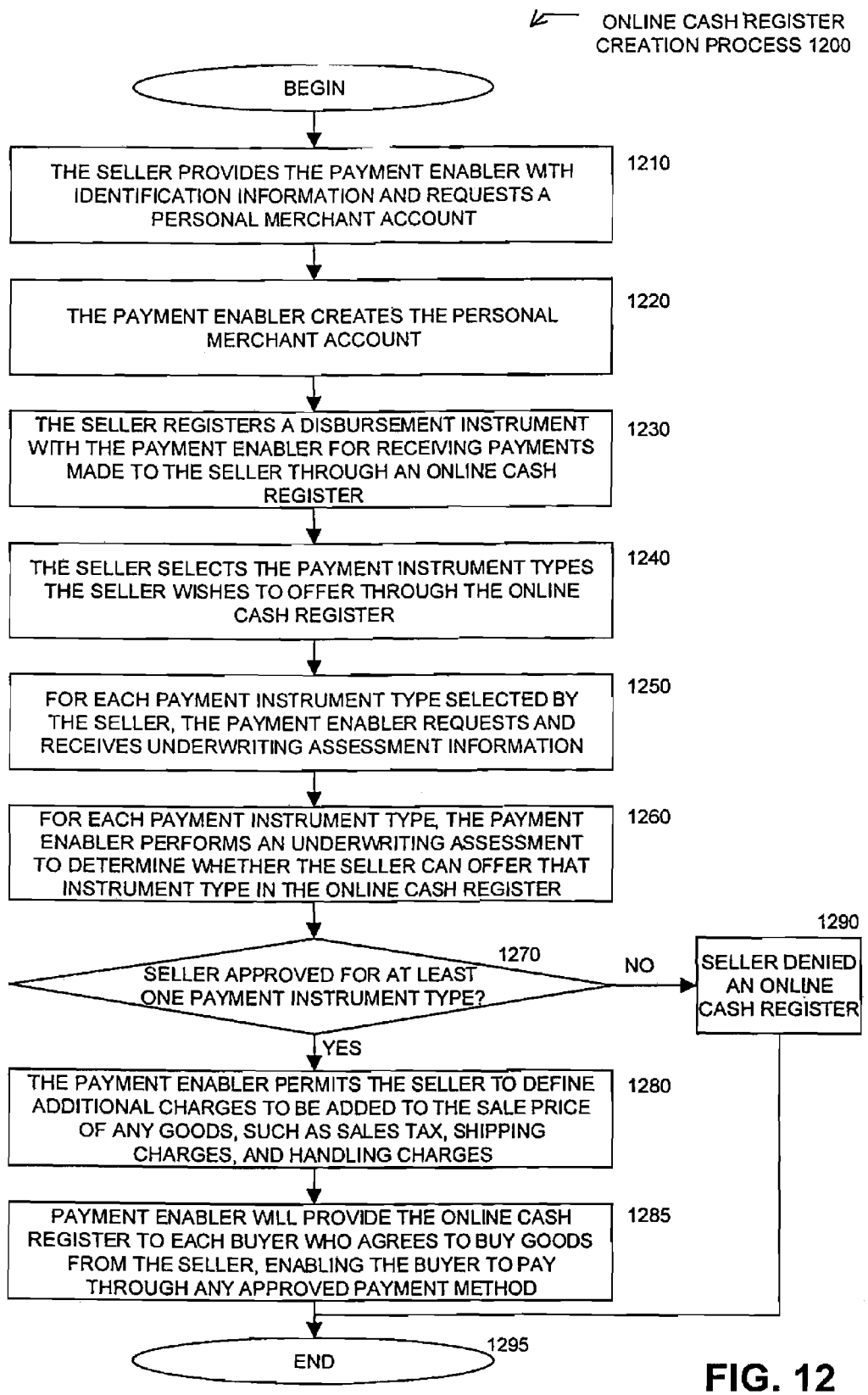
FIG. 12 is a flow chart illustrating the steps of an online cash register creation process in accordance with an exemplary embodiment of the present invention.

FIG. 12 is a logical flow diagram of an exemplary online cash register creation process 1200. The process 1200 begins with step 1210, in which the seller 130 provides the payment enabler 240 with identification information about the seller and requests a personal merchant account. In step 1220, the payment enabler 240 creates the personal merchant account. The seller 130 can then access this account at any time through a link from the transaction facilitator 230.

In step 1230, the seller 130 registers a disbursement instrument with the payment enabler 240. The payment enabler 240 can use this disbursement instrument for transferring payment to the seller 130 after receipt of the payment through the online cash register.

In step 1240, the seller 130 selects the payment instrument types the seller wishes to offer through the online cash register. In step 1250, the payment enabler 240 requests and receives underwriting assessment information for each payment instrument type selected by the seller in step 1240.

In step 1260, the payment enabler performs an underwriting assessment for each payment instrument type to determine whether to let the seller 130 offer that payment instrument type in the seller's online cash register. This underwriting assessment is based upon the underwriting assessment information received in step 1250.

In step 1270, the payment enabler 240 determines if the seller 130 has been approved for at least one payment instrument type. If the seller 130 has not been approved for at least one payment instrument type, then the "NO" branch is followed to step 1290, and the seller is denied an online cash register. The process 1200 then ends in step 1295.

Referring again to step 1270, if payment enabler 240 determines that the seller 130 has been approved for at least one payment instrument type, then the "YES" branch is followed to step 1280. In step 1280, the payment enabler 240 permits the seller 130 to define additional charges to be added automatically by the online cash register to the sale price of any goods. Such additional charges may include sales tax, shipping charges, and handling charges.

As shown in step 1285, the creation of the online cash register is complete. The payment enabler 240 will provide the online cash register to each buyer 110 who agrees to buy goods from the seller 130. Through the online cash register, the buyer 110 can then pay the seller 130 through any payment method for which the seller 130 has been approved through the underwriting process. The process 1200 then ends in step 1295.

The logical flow diagram shown in FIG. 12 illustrates one embodiment in which the payment enabler 240 performs an underwriting assessment for each payment instrument type. Alternatively, the payment enabler 240 may perform a single underwriting assessment prior to approving the seller 130 for a personal merchant account. In this alternative embodiment, the personal merchant account is not created until the seller 130 is approved by the payment enabler 240.

Figure 13:
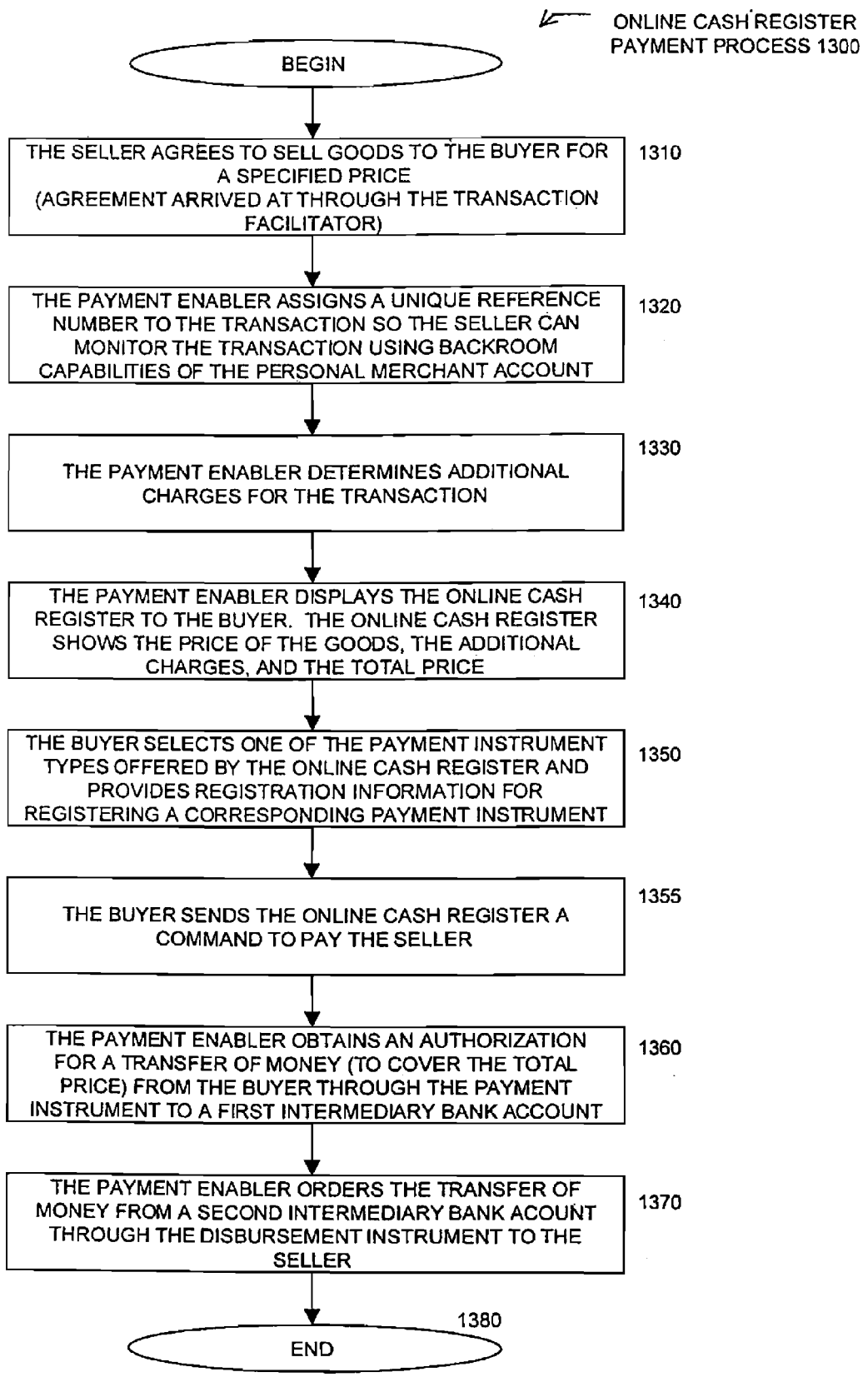
FIG. 13 is a flow chart illustrating the steps of an online cash register payment process in accordance with an exemplary embodiment of the present invention.

FIG. 13 is a logical flow diagram of an exemplary online cash register payment process 1300. The process 1300 begins with step 1310, in which the seller 130 agrees to sell goods to the buyer 110 for a specified price. This agreement is arrived at through the transaction facilitator 230.

In step 1320, the payment enabler 240 assigns a unique reference number to the transaction. This reference number enables the seller 130 to monitor the transaction using the backroom capabilities of the personal merchant account. The seller 130 can also use this reference number to refer to the transaction when contacting the intermediary 120 to discuss the transaction, such as during fraud investigations and chargebacks.

In step 1330, the payment enabler 240 determines additional charges for the transaction. For example, the payment enabler 240 may calculate sales tax, shipping charges, and handling charges. In step 1340, the payment enabler 240 displays the online cash register to the buyer 110. The online cash register shows the price of the goods, the additional charges, and the total price. The online cash register also offers the buyer 110 a choice of payment instrument types to use for paying the total price.

In step 1350, the buyer 110 selects one of the payment instrument types offered by the online cash register. The buyer 110 then provides the online cash register with registration information for registering a payment instrument corresponding to the payment instrument type selected. In step 1355, the buyer 110 sends the online cash register a command to pay the seller 130.

In response to the command of the buyer 110, in step 1360, the payment enabler 240 obtains an authorization for a transfer of money from the buyer through the payment instrument to a first intermediary bank account. The amount of money authorized covers the total price shown by the online cash register. In step 1370, the payment enabler 240 orders the transfer of money from a second intermediary bank account through the disbursement instrument to the seller 130. The amount of this transfer covers the amount due to the seller 130. The process 1300 then ends in step 1380.

The invention claimed is:

1. A computer-implemented method for facilitating a payment from a buyer operating a buyer computer to a seller operating a seller computer in connection with an online auction transaction utilizing a payment enabling system operated by a payment enabler, wherein the transaction is facilitated by a transaction facilitator comprising a network-accessible auction transaction computer, the computer-implemented method comprising:

receiving, by the payment enabling system, online redirection of the buyer as a party registered with the transaction facilitator in connection with an online auction completed by the transaction facilitator;

communicating, by the payment enabling system to the buyer computer for display to the buyer and following the redirection, information corresponding to a plurality of selectable payment instrument types;

receiving, by the payment enabling system from the buyer computer, information corresponding to a buyer selection of one of the plurality of payment instrument types;

registering, by the payment enabling system on behalf of the buyer, a payment instrument associated with the selected payment instrument type;

receiving, by the payment enabling system from the seller computer in response to a request for the seller to register with the payment enabler, information corresponding to a seller selection of a disbursement instrument type that facilitates payment to the seller by the payment enabling system on behalf of the buyer, wherein the request to register is communicated to the seller computer by the transaction facilitator subsequent to the completion of the online auction;

registering, by the payment enabling system on behalf of the seller and subsequent to the completion of the online auction and the redirection to the payment enabling system, a disbursement instrument associated with the selected disbursement instrument type;

receiving, by the payment enabling system from the transaction computer, a command for a transfer of a predetermined amount of money from the buyer to the seller in connection with a transaction of resulting from the online auction conducted by the transaction facilitator;

effecting, by the payment enabling system, a transfer of at least the predetermined amount of money from the buyer through the registered payment instrument associated with the buyer; and effecting, by the payment enabling system to the seller, a transfer of a disbursement amount of money through the registered disbursement instrument associated with the seller.

2. The method of claim 1, wherein registering a payment instrument comprises registering a payment instrument prior to the transaction between the buyer and the seller in a static registration process.

3. The method of claim 1, wherein registering a payment instrument comprises registering a payment instrument after the transaction between the buyer and the seller in a dynamic registration process.

4. The method of claim 1, wherein registering a disbursement instrument comprises registering a disbursement after the transaction between the buyer and the seller in a dynamic registration process.

5. The method of claim 1, wherein the auction transaction computer assigns unique user IDs to parties permitted to participate in the auction, and further comprising receiving a unique user ID of the buyer and a unique user ID of the seller upon redirection.

6. The method of claim 5, wherein the auction transaction computer assigns a transaction ID to a transaction between the buyer and the seller, and wherein the command for transfer of money includes the buyer's user ID, the seller's user ID, and the transaction ID.

7. The method of claim 1, wherein the redirection is effected in response to one of the buyer or the seller choosing a menu option that appears when logging onto a web site associated with the auction transaction facilitator.

8. The method of claim 1, wherein the redirection is effected in response to the activation by one of the buyer or the seller of a hyperlink in an email.

9. The method of claim 1, wherein communicating information and receiving information corresponding to a buyer selection are effected through a web page provided by the payment enabling system.

10. The method of claim 9, wherein the web page provided by the payment enabling system is branded identically with a web page provided by the auction transaction facilitator.

11. The method of claim 1, further comprising generating an electronic invoice in connection with the transaction through a web page provided by the payment enabling system.

12. The method of claim 11, wherein the electronic invoice includes information selected from the group consisting of: bid price, shipping charges, handling charges, total price, and fees charged by the payment enabler.

13. The method of claim 11, wherein the buyer reviews the electronic invoice by use of a web page provided by the payment enabling system.

14. The method of claim 11, wherein the buyer is informed of the existence of the electronic invoice by access to the buyer's account with the transaction facilitator or by email.

15. The method of claim 11, further comprising providing a web page for a buyer to negotiate terms of the invoice via email or via a web page provided by the payment enabling system.

16. The method of claim 1, wherein the buyer provides information to the transaction facilitator indicative of a desire to pay on a transaction via the services of the payment enabler, and further comprising receiving and storing transaction details information from the transaction computer.

17. The method of claim 16, wherein the redirection occurs in response to the provision of the information from the buyer to the transaction facilitator indicative of the desire to pay on the transaction.

18. The method of claim 16, wherein the request to register is communicated by the transaction facilitator through the auction site and following completion of the online auction, and wherein registering the disbursement instrument comprises registering the disbursement instrument in response to the seller accepting the request to register with the payment enabling system.

19. The method of claim 1, wherein the plurality of payment instrument types are selected from the group consisting of: flash cash deposit, credit card, electronic fund transaction, virtual private payment account, and paper check.

20. The method of claim 1, wherein the predetermined amount of money from the buyer includes an amount to cover the cost of the payment service provided by the payment enabler, and the disbursement amount of money to the seller comprises an amount of money from the buyer less the cost of the payment service.

21. The method of claim 1, wherein communicating information corresponding to a plurality of selectable payment instrument types to the buyer computer and receiving from the buyer computer information corresponding to a buyer selection of a payment instrument type is effected through an online cash register on behalf of the seller.

22. The method of claim 21, further comprising communicating to the buyer computer via the online cash register information corresponding to the transaction including the specified price, any additional charges, and the total price.

23. A system for facilitating a payment from a buyer to a seller in connection with an online transaction utilizing a payment enabling system operated by a payment enabler, for use in connection with an online auction system including a buyer computer operated by a buyer, a seller computer operated by a seller, and a transaction facilitator comprising a network-accessible auction transaction computer that facilitates transactions between buyers and sellers, the system comprising:

a payment enabling system;

an interface for data communications with the buyer computer;

an interface for data communications with the seller computer;

an interface for data communications with the transaction computer;

the payment enabling system receiving online redirection of the buyer as a party registered with the transaction facilitator in connection with an online auction completed by the transaction facilitator;

the payment enabling system communicating, to the buyer computer for display to the buyer and following the redirection, information corresponding to a plurality of selectable payment instrument types;

the payment enabling system receiving from the buyer computer information corresponding to a buyer selection of one of the plurality of payment instrument types;

the payment enabling system registering, on behalf of the buyer, a payment instrument associated with the selected payment instrument type;

the payment enabling system receiving, from the seller computer in response to a request for the seller to register with the payment enabler, information corresponding to a seller selection of a disbursement instrument type that facilitates payment to the seller by the payment enabling system on behalf of the buyer, wherein the request to register is communicated to the seller computer by the transaction facilitator subsequent to the completion of the online auction;

the payment enabling system registering, on behalf of the seller and subsequent to the completion of the online auction and the redirection to the payment enabling system, a disbursement instrument associated with the selected disbursement instrument type;

the payment enabling system receiving a command from the transaction computer for a transfer of a predetermined amount of money from the buyer to the seller in connection with a transaction resulting from the online auction conducted by the transaction facilitator;

the payment enabling system effecting a transfer of at least the predetermined amount of money from the buyer through the registered payment instrument associated with the buyer; and the payment enabling system effecting a transfer of a disbursement amount of money to the seller through the registered disbursement instrument associated with the seller.

24. The system of claim 23, wherein the payment enabling system registers the payment instrument prior to the transaction between the buyer and the seller in a static registration process.

25. The system of claim 23, wherein the payment enabling system registers the payment instrument after the transaction between the buyer and the seller in a dynamic registration process.

26. The system of claim 23, wherein the payment enabling system registers the disbursement instrument after the transaction between the buyer and the seller in a dynamic registration process.

27. The system of claim 23, wherein the auction transaction computer assigns unique user IDs to parties permitted to participate in the auction, and wherein the payment enabling system receives a unique user ID of the buyer and a unique user ID of the seller upon redirection.

28. The system of claim 27, wherein the auction transaction computer assigns a transaction ID to a transaction between the buyer and the seller, and wherein the command for transfer of money includes the buyer's user ID, the seller's user ID, and the transaction ID.

29. The system of claim 23, wherein the redirection is effected in response to one of the buyer or the seller choosing of a menu option that appears when logging onto a web site associated with the auction transaction facilitator.

30. The system of claim 23, wherein the redirection is effected in response to the activation by one of the buyer or the seller of a hyperlink in an email.

31. The system of claim 23, wherein the communication of information and receiving of information corresponding to a buyer selection are effected through a web page provided by the payment enabling system.

32. The system of claim 31, wherein the web page provided by the payment enabling system is branded identically with a web page provided by the auction transaction facilitator.

33. The system of claim 23, wherein the payment enabling system further generates an electronic invoice in connection with the transaction through a web page provided by the payment enabling system.

34. The system of claim 33, wherein the electronic invoice includes information selected from the group consisting of: bid price, shipping charges, handling charges, total price, and fees charged by the payment enabler.

35. The system of claim 33, wherein the buyer reviews the electronic invoice by use of a web page provided by the payment enabling system.

36. The system of claim 33, wherein the buyer is informed of the existence of the electronic invoice by access to the buyer's account with the transaction facilitator or by email.

37. The system of claim 33, wherein the payment enabling system further provides a web page for a buyer to negotiate terms of the invoice via email or via a web page provided by the payment enabling system.

38. The system of claim 23, wherein the buyer provides information to the transaction facilitator indicative of a desire to pay on a transaction via the services of the payment enabler, and wherein the payment enabling system further receives and stores transaction details information from the transaction computer.

39. The system of claim 38, wherein the redirection occurs in response to the provision of the information from the buyer to the transaction facilitator indicative of the desire to pay on the transaction.

40. The system of claim 38, wherein the transaction facilitator communicates the request to register through the auction site and following completion of the online auction, and
wherein the disbursement instrument is registered in response to the seller accepting the request to register with the payment enabling system.

41. The system of claim 23, wherein the plurality of payment instrument types are selected from the group consisting of: flash cash deposit, credit card, electronic fund transaction, virtual private payment account, and paper check.

42. The system of claim 23, wherein the predetermined amount of money from the buyer includes an amount to cover the cost of the payment service provided by the payment enabler, and the disbursement amount of money to the seller comprises an amount of money from the buyer less the cost of the payment service.

43. The system of claim 23, wherein the payment enabling system communications information corresponding to a plurality of selectable payment instrument types to the buyer computer and receives from the buyer computer information corresponding to a buyer selection of a payment instrument type through an online cash register provided on behalf of the seller.

44. The system of claim 43, wherein the payment enabling system communicates to the buyer computer via the online cash register information corresponding to the transaction including the specified price, any additional charges, and the total price.

* * * * *

UNITED STATES PATENT AND TRADEMARK OFFICE
CERTIFICATE OF CORRECTION

PATENT NO. : 7,765,148 B2  Page 1 of 1
APPLICATION NO. : 11/673731
DATED : July 27, 2010
INVENTOR(S) : Dan A. German et al.

It is certified that error appears in the above-identified patent and that said Letters Patent is hereby corrected as shown below:

At column 29, line 4, delete "of" after "transaction".

Signed and Sealed this

Sixteenth Day of November, 2010

David J. Kappos
*Director of the United States Patent and Trademark Office*